United States Patent
Youn et al.

(10) Patent No.: US 10,856,173 B2
(45) Date of Patent: Dec. 1, 2020

(54) METHOD AND SMF FOR SUPPORTING QOS

(71) Applicant: LG ELECTRONICS INC., Seoul (KR)

(72) Inventors: Myungjune Youn, Seoul (KR); Laeyoung Kim, Seoul (KR); Hyunsook Kim, Seoul (KR); Jinsook Ryu, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/718,096

(22) Filed: Dec. 17, 2019

(65) Prior Publication Data
US 2020/0128432 A1 Apr. 23, 2020

Related U.S. Application Data

(63) Continuation of application No. PCT/KR2019/003766, filed on Apr. 1, 2019.
(Continued)

(30) Foreign Application Priority Data

Jun. 26, 2018 (KR) .................. 10-2018-0073142
Sep. 20, 2018 (KR) .................. 10-2018-0113284
(Continued)

(51) Int. Cl.
H04W 28/02 (2009.01)
H04W 76/16 (2018.01)
(Continued)

(52) U.S. Cl.
CPC ......... *H04W 28/0268* (2013.01); *H04L 47/24* (2013.01); *H04L 47/805* (2013.01);
(Continued)

(58) Field of Classification Search
CPC ...... H04L 47/805; H04L 47/24; H04W 36/14; H04W 36/0027; H04W 36/0044;
(Continued)

(56) References Cited

U.S. PATENT DOCUMENTS

2005/0232212 A1* 10/2005 Kang ................ H04W 36/0061
370/338
2015/0237535 A1* 8/2015 Aramoto ............... H04W 36/14
455/436
(Continued)

FOREIGN PATENT DOCUMENTS

WO WO 2013/189512 * 12/2013 ............ H04W 28/16

OTHER PUBLICATIONS

PCT International Application No. PCT/KR2019/003766, International Search Report dated Jul. 11, 2019, 4 pages.
(Continued)

*Primary Examiner* — Ricardo H Castaneyra
(74) *Attorney, Agent, or Firm* — Lee Hong Degerman Kang Waimey

(57) ABSTRACT

One disclosure of the present specification provides a method by which a session management function (SMF) supports quality of service (QoS). The method can comprise the steps of: determining, on the basis of a QoS flow not being a guaranteed bit rate (GBR) QoS flow in a multi-access (MA) protocol data unit (PDU) session, that a QoS profile is transmitted to both a third generation partnership project (3GPP) access and a non-3GPP access; determining, on the basis of the QoS flow being the GBR QoS flow in the MA PDU session, that the QoS profile is transmitted to only one of the 3GPP access and the non-3GPP access; and transmitting the QoS profile on the basis of the determinations.

17 Claims, 26 Drawing Sheets

Related U.S. Application Data

(60) Provisional application No. 62/655,192, filed on Apr. 9, 2018.

(30) Foreign Application Priority Data

Sep. 28, 2018 (KR) ........................ 10-2018-0115480
Oct. 8, 2018 (KR) ........................ 10-2018-0119687

(51) Int. Cl.
| | | |
|---|---|---|
| *H04L 12/851* | (2013.01) | |
| *H04L 12/927* | (2013.01) | |
| *H04W 28/12* | (2009.01) | |
| *H04W 36/00* | (2009.01) | |
| *H04W 36/14* | (2009.01) | |

(52) U.S. Cl.
CPC ....... *H04W 28/12* (2013.01); *H04W 36/0027* (2013.01); *H04W 36/0044* (2013.01); *H04W 36/14* (2013.01); *H04W 76/16* (2018.02)

(58) Field of Classification Search
CPC . H04W 28/12; H04W 28/0268; H04W 76/16; H04W 28/02; H04W 28/10; H04W 76/15; H04W 48/00
See application file for complete search history.

(56) References Cited

U.S. PATENT DOCUMENTS

2017/0324652 A1    11/2017   Lee et al.
2017/0332282 A1    11/2017   Dao
2019/0274178 A1*    9/2019   Salkintzis ............. H04W 76/16

OTHER PUBLICATIONS

ZTE, "QoS flow handling for Multi-Access PDU session", SA WG2 Meeting #126, S2-181544, Mar. 2018, 6 pages.
3rd Generation Partnership Project (3GPP), "Technical Specification Group Services and System Aspects; System Architecture for the 5G System; Stage 2 (Release 15)," 3GPP TS 23.501 V15.1.0, Mar. 2018, 203 pages.
Etri, "23.793: Proposal Solution for Multi-access PDU Session", SA WG2 Meeting #126, S2-182123, Mar. 2018, 10 pages.
European Patent Office Application Serial No. 19784798.1 Search Report dated May 27, 2020, 6 pages.
Intel, "Resolving editor's note on PDU session modification for non-3GPP access", S2-178317, SA WG2 Meetng #124, Dec. 2017, 3 pages.
LG Electronics, "QoS handling in MA-PDU Session", S2-186720, 3GPP TSG_SA WG2 Meeting #128, Jul. 2018, 4 pages.

* cited by examiner

METHOD AND SMF FOR SUPPORTING QOS

CROSS-REFERENCE TO RELATED APPLICATIONS

This application is a continuation of International Application No. PCT/KR2019/003766, filed on Apr. 1, 2019, which claims the benefit of U.S. Provisional Application No. 62/655,192, filed on Apr. 9, 2018, and also claims the benefit of earlier filing date and right of priority to Korean Patent Application Nos. 10-2018-0073142, filed on Jun. 26, 2018, 10-2018-0113284, filed on Sep. 20, 2018, 10-2018-0115480, filed on Sep. 28, 2018, and 10-2018-0119687, filed on Oct. 8, 2018, the contents of which are all hereby incorporated by reference herein in their entireties.

BACKGROUND OF THE DISCLOSURE

Field of the Disclosure

The present disclosure relates to a next mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| Reference point | Description |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |

TABLE 1-continued

| Reference point | Description |
| --- | --- |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

<Next-Generation Mobile Communication Network>

With the success of long term evolution (LTE)/LTE-A (LTE-Advanced) for the 4th generation mobile communication, more interest is rising to the next generation, i.e., 5th generation (also known as 5G) mobile communication and extensive research and development are being carried out accordingly.

The 5G mobile communication defined in the international telecommunication union (ITU) provides a data transfer rate of up to 20 Gbps and a sensible transfer rate of at least 100 Mbps anytime anywhere. 'IMT-2020' is a formal name, and aims to be commercialized in the year 2020 worldwide.

The ITU proposes three usage scenarios, e.g., eMBB (enhanced Mobile BroadBand), mMTC (massive Machine Type Communication), and URLLC (Ultra Reliable and Low Latency Communications).

First, the URLLC relates to a usage scenario which requires a high reliability and a low latency. For example, a service such as autonomous driving, factory automation, and augmented reality requires a high reliability and a low latency (e.g., a latency less than or equal to 1 ms). At present, a latency of 4G (LTE) is statistically 21-43 ms (best 10%), 33-75 ms (median). This is insufficient to support a service requiring the latency less than or equal to 1 ms.

Next, an eMBB usage scenario relates to a usage scenario requiring a mobile ultra-wide band.

It seems that a core network designed for the existing LTE/LTE-A has difficulty in accommodating a high-speed service of the ultra-wide band.

Therefore, it is urgently required to re-design the core network in 5G mobile communication.

FIG. 2 shows an example of an expected structure of next-generation mobile communication from a node perspective.

As can be seen with reference to FIG. 2, a UE is coupled to a data network (DN) via a next generation radio access network (RAN).

The illustrated control plane function (CPF) node performs the entirety or part of a mobility management entity (MME) function of 4G mobile communication and the entirety or part of a control plane function of an S-serving gateway (SG) and PDN gateway (P-GW). The CPF node includes an access and mobility management function (AMF) and a session management function (SMF).

The illustrated user plane function (UPF) node is a type of a gateway through which user data is transmitted/received. The UPF node may perform the entirety or part of a user plane function of an S-GW or P-GW of 4G mobile communication.

The illustrated policy control function (PCF) is a node which controls a provider's policy.

The illustrated application function (AF) is a server for providing several services to the UE.

The illustrated unified data management (UDM) is a type of a server which manages subscriber information, such as a home subscriber server (HSS) of 4G mobile communication. The UDM stores the subscriber information in a unified data repository (UDR) and manages it.

The illustrated authentication server function (AUSF) authenticates and manages the UE.

The illustrated network slice selection function (NSSF) is a node for network slicing as described below.

In FIG. 2, the UE can simultaneously access two data networks by using multiple protocol data unit or packet data unit (PDU) sessions.

FIG. 3 shows an example of an architecture for supporting simultaneous access to two data networks.

In the architecture shown in FIG. 3, a UE uses one PDU session to simultaneously access the two data networks.

<Network Slice>

The following describes the slicing of the network to be introduced in the next generation mobile communication.

Next-generation mobile communication introduces the concept of network slicing in order to provide various services through a single network. In this connection, slicing a network refers to a combination of network nodes with the functions needed to provide a specific service. The network node that constitutes the slice instance may be a hardware independent node, or it may be a logically independent node.

Each slice instance may consist of a combination of all the nodes needed to construct the entire network. In this case, one slice instance alone may provide service to the UE.

Alternatively, the slice instance may consist of a combination of some of the nodes that make up the network. In this case, the slice instance may provide service to the UE in association with other existing network nodes without the slice instance alone providing the service to the UE. In addition, a plurality of slice instances may cooperate with each other to provide the service to the UE.

The slice instance may differ from a dedicated core network in that all network nodes, including the core network (CN) node and the RAN may be separated from each other. Further, the slice instance differs from the dedicated core network in that the network nodes may be logically separated.

FIG. 4A is an exemplary diagram illustrating an example of an architecture for implementing the concept of network slicing.

As can be seen from FIG. 4A, the core network (CN) may be divided into several slice instances. Each slice instance may contain one or more of a CP function node and a UP function node.

Each UE may use a network slice instance corresponding to its service through RAN.

Unlike the case shown in FIG. 4A, each slice instance may share one or more of a CP function node, and a UP function node with another slice instance. This will be described with reference to FIG. 4B below.

FIG. 4B is an exemplary view showing another example of an architecture for implementing the concept of network slicing.

Referring to FIG. 4B, a plurality of UP function nodes are clustered, and a plurality of CP function nodes are also clustered.

Further, referring to FIG. 4B, slice instance #1 (or instance #1) in the core network includes a first cluster of an UP function node. Moreover, the slice instance #1 shares the cluster of the CP function node with slice instance #2 (or instance #2). The slice instance #2 includes a second cluster of an UP function node.

The illustrated NSSF selects a slice (or instance) that can accommodate the UE's service.

The illustrated UE may use the service #1 via the slice instance #1 selected by the NSSF and may use the service #2 via the slice instance #2 selected by the NSSF.

<Roaming in Nest Generation Mobile Network>

Meanwhile, there are two types of a method for processing a signaling request from a UE while the UE roams to a visit network, for example, a visited public land mobile network (VPLMN). The first method is a local break out (LBO) method in which the signaling request from the UE is processed at the network. The second method is a home routing (HR) method in which the visit network transmit the signaling request from the UE to a home network of the UE.

FIG. 5A is a diagram illustrating an example of architecture to which the LBO method is applied during roaming, and FIG. 5B is a diagram illustrating an example of architecture to which the HR method is applied during roaming.

As illustrated in FIG. 5A, in the architecture to which the LBO method is applied, data of a user is transmitted to a data network in the VPLMN. To this end, a PCF in the VPLMN performs an interaction with an AF to create a PCC rule for a service in the VPLMN. A PCF node in the VPLMN creates the PCC rule based on a policy that is set according to a roaming agreement with a home public land mobile network (HPLMN) operator.

As illustrated in FIG. 5B, in the architecture to which the HR method is applied, the data of the UE is transmitted to the data network in the HPLMN.

<Data Offloading to Non-3GPP Network>

In next-generation mobile communication, data of a UE may be offloaded to a non-3GPP network, for example, a wireless local area network (WLAN) or a Wi-Fi.

FIGS. 6A to 6F illustrate architectures for offloading data to the non-3GPP network.

A WLAN or a Wi-Fi is regarded as an untrusted non-3GPP network. In order to connect the non-3GPP network to a core network, a non-3GPP interworking function (N3IWF) may be added.

Meanwhile, a PDU session may be established through a 3GPP access and a non-3GPP access. As such, an idea that suggests establishing a multi-access (MA) PDU session by bundling two separate PDU sessions established through the different accesses has been proposed.

Yet, a detailed method for establishing an MA PDU session and a method for efficiently managing an MA PDU session has not been discussed, and thus, it was not possible to carry out the idea.

In particular, there is a problem that an existing quality of service (QoS) framework is not applicable to an MA PDU session.

SUMMARY OF THE DISCLOSURE

The disclosures of the specification has been made in an effort to solve the above-described problems.

Accordingly, in an effort to solve the aforementioned problem, a disclosure of the present specification provides a method for supporting a quality of service (QoS). The method may be performed by a session management function (SMF) and comprise: determining to transmit a QoS profile to both of a 3rd generation partnership project (3GPP) access and a non-3GPP access, based on that a QoS flow in a multi-access (MA) protocol data unit (PDU) session is not a guaranteed bit rate (GBR) QoS flow; determining to transmit the QoS profile to one access of the 3GPP access and the non-3GPP access, based on that the QoS flow in the MA PDU Session is the GBR QoS flow; and transmitting the QoS profile based on the determinations.

The method may further comprise: determining the one access among the 3GPP access and the non-3GPP access.

The method may further comprise: transmitting a QoS rule to a user equipment (UE) based on that the MA PDU session is established.

The QoS rule may be commonly used for both the 3GPP access and the non-3GPP access.

The MA PDU session may be established over both the 3GPP access and the non-3GPP access.

The method may further include transmitting a steering rule to one or more of a user equipment (UE) and a user plane function (UPF). The steering rule may cause the QoS flow to be equally steered to the one access among the 3GPP access and the non-3GPP access.

The method may further include moving the GBR QoS flow from a first access to a second access among the 3GPP access and the non-3GPP access according to a steering rule, receiving from a UPF an indication indicating that switching is necessary. The indication may include information regarding a QoS flow that is a target of switching and information regarding the second access that is a target access of switching.

The method may further include informing, at the SMF, the UPF of successful completion of the switching of the GBR QoS flow. The QoS profile may be transmitted based on the indication. The indication indicating the successful completion of the switching of the GBR QoS flow may allow the UPF to perform switching to the second access.

The one access to which the QoS profile may be transmitted is an access currently in use. The QoS profile may be used to set up a resource on the access currently in use.

Accordingly, in an effort to solve the aforementioned problem, a disclosure of the present specification provides a session management function (SMF) for supporting a quality of service (QoS). The SMF may comprise: a transceiver; and a processor configured to control the transceiver. The processor may perform operations of determining to transmit a QoS profile to both of a 3rd generation partnership project (3GPP) access and a non-3GPP access, based on that a QoS flow in a multi-access (MA) protocol data unit (PDU) session is not a guaranteed bit rate (GBR) QoS flow; determining to transmit the QoS profile to one access of the 3GPP access and the non-3GPP access, based on that the QoS flow in the MA PDU Session is the GBR QoS flow; and transmitting the QoS profile based on the determinations.

According to the disclosure of the present disclosure, the problem of the conventional technology described above may be solved.

DESCRIPTION OF EXEMPLARY EMBODIMENTS

Figure 1:
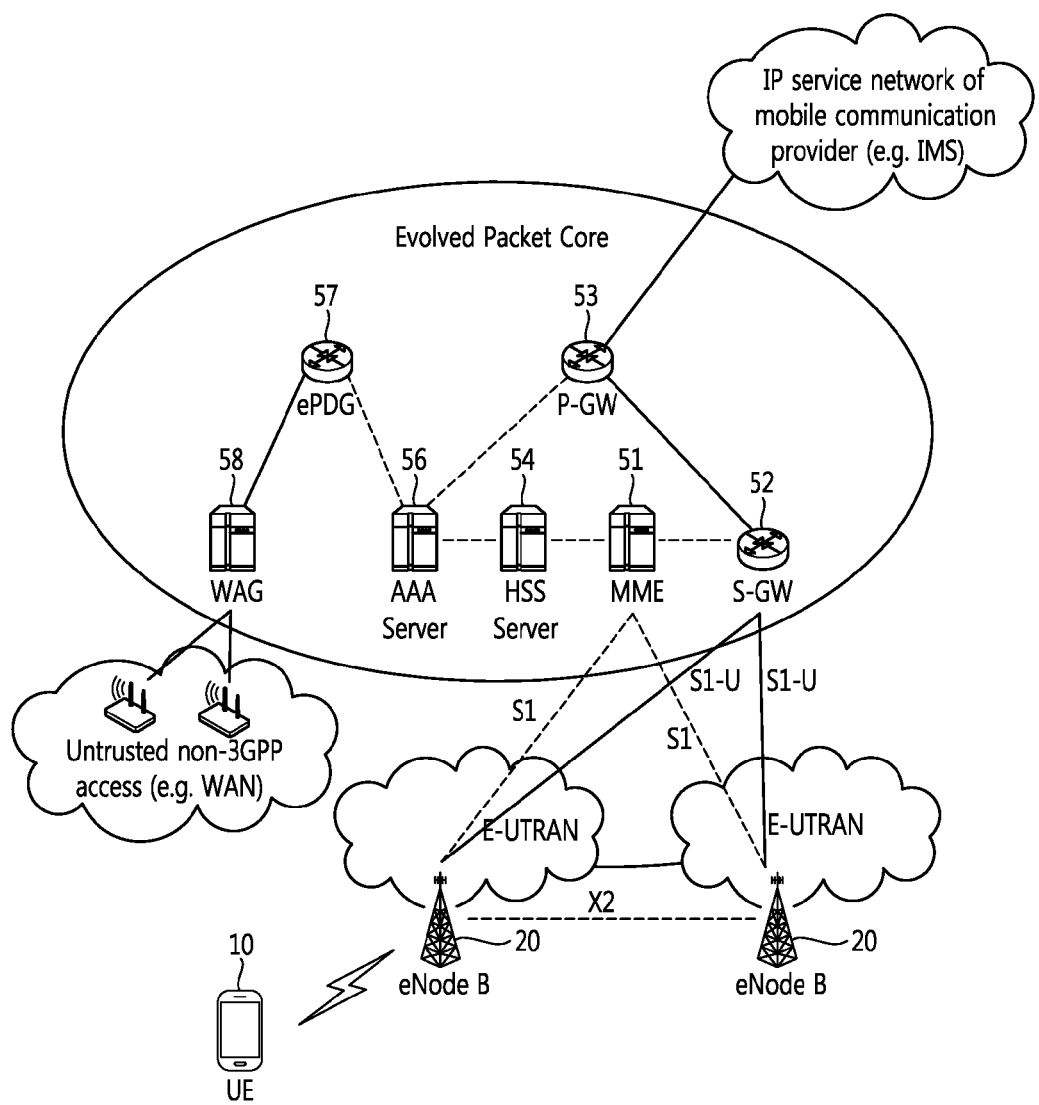
FIG. 1 shows the configuration of an evolved mobile communication network.
Figure 2:
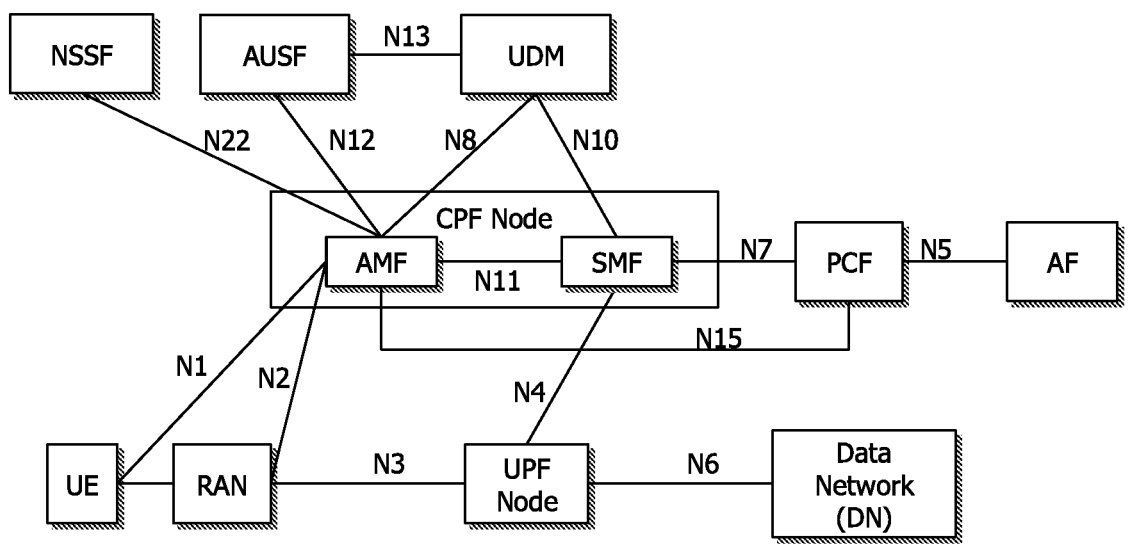
FIG. 2 shows an example of an expected structure of next-generation mobile communication from a node perspective.
Figure 3:
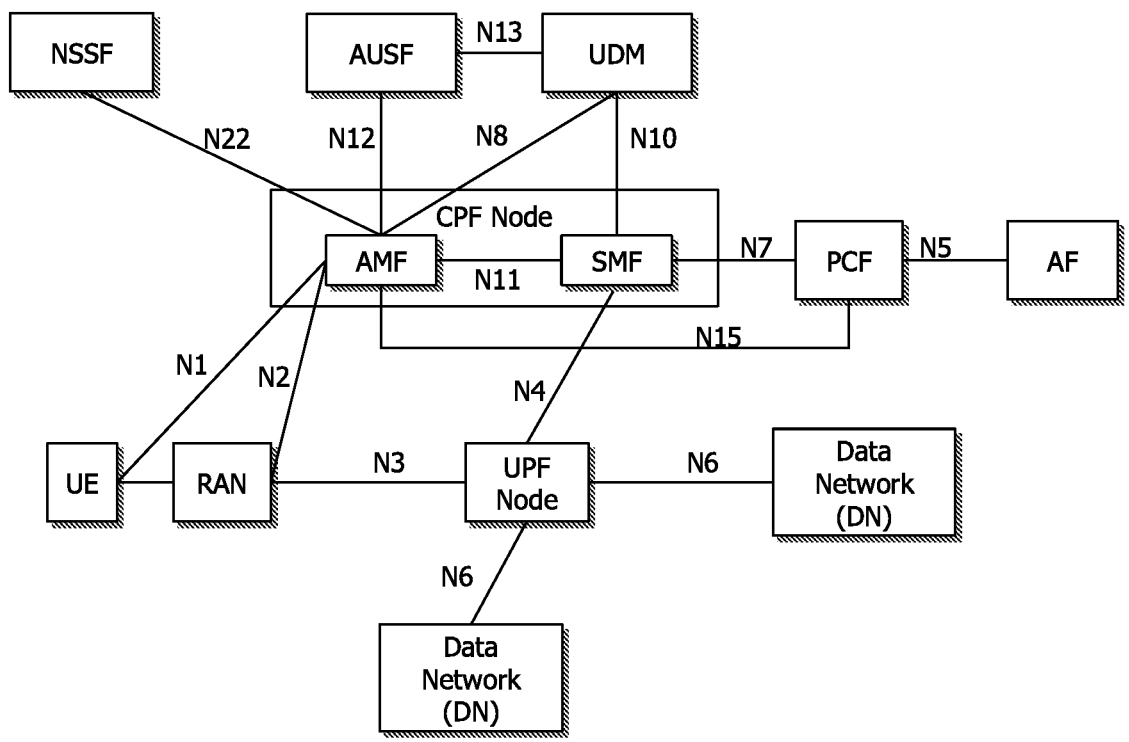
FIG. 3 shows an example of an architecture for supporting simultaneous access to two data networks.
Figure 4A:
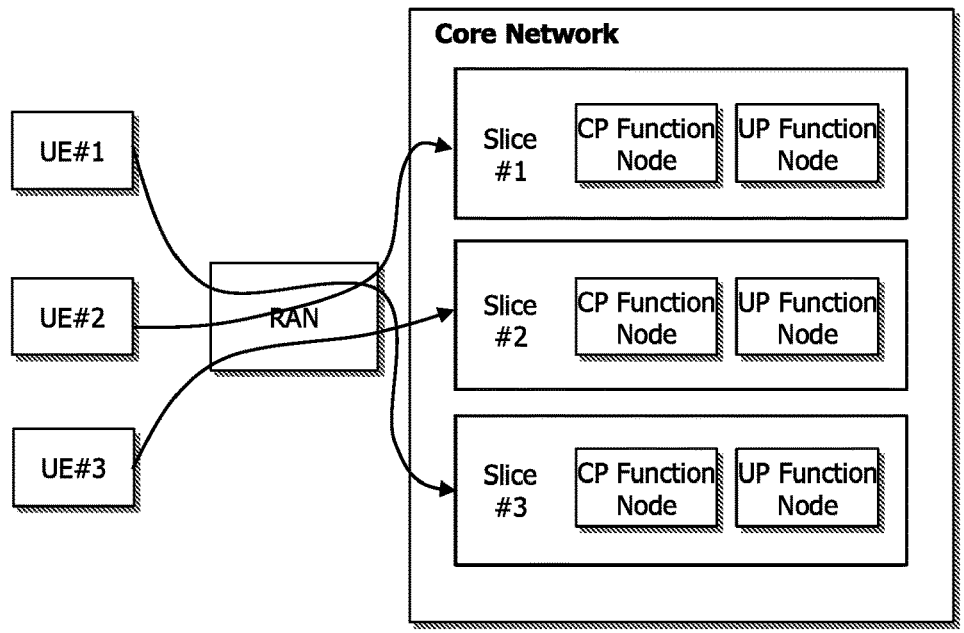
FIG. 4A is an exemplary diagram illustrating an example of an architecture for implementing the concept of network slicing.
Figure 4B:
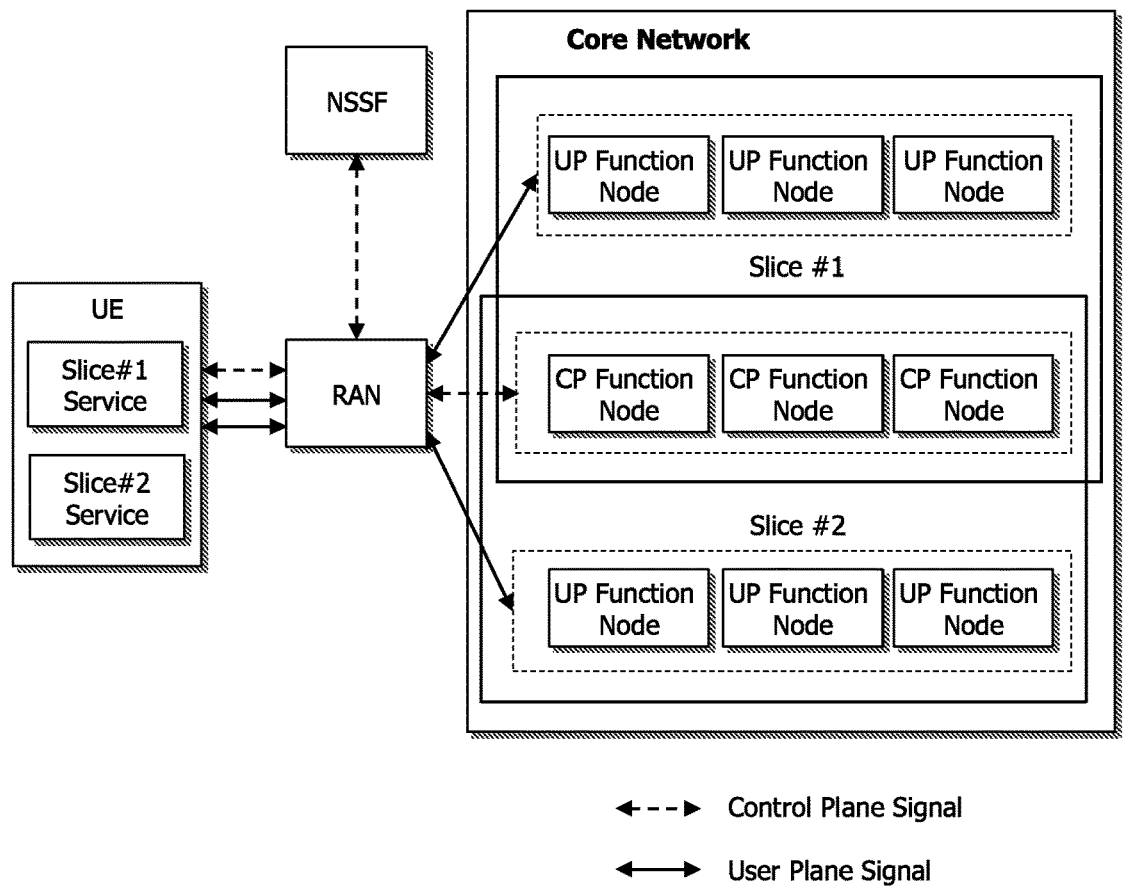
FIG. 4B is an exemplary view showing another example of an architecture for implementing the concept of network slicing.
Figure 5A:
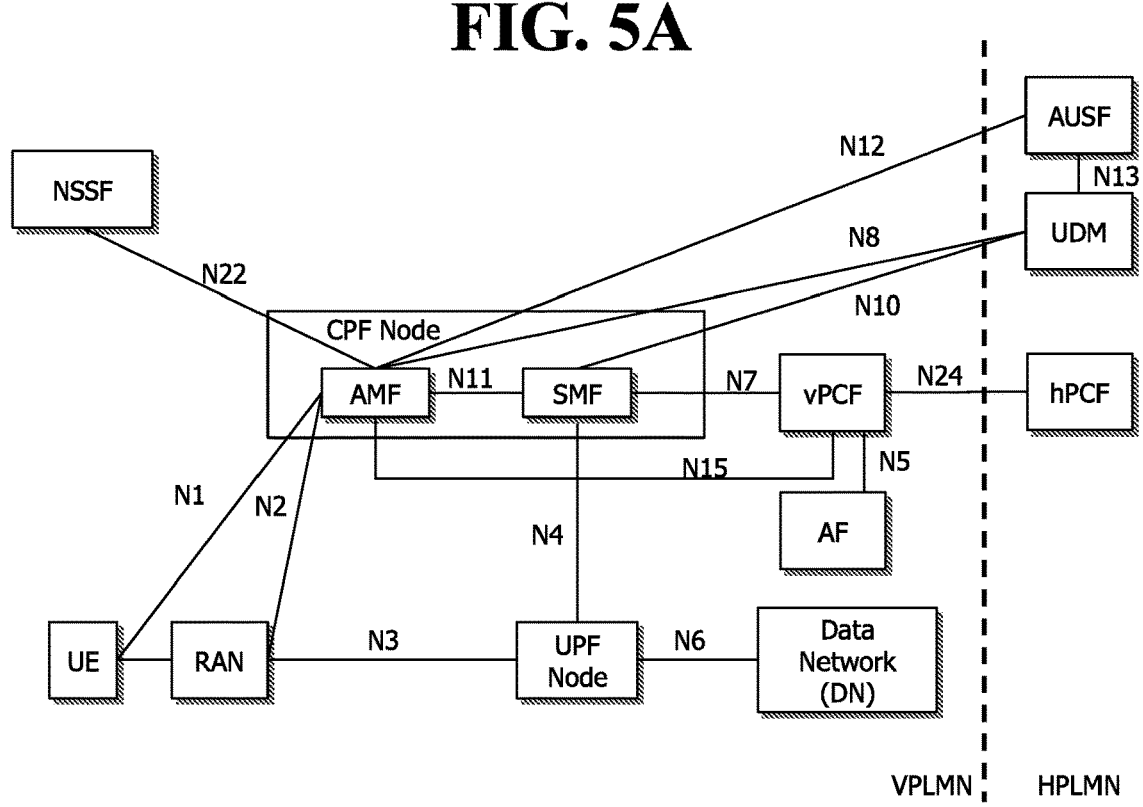
FIG. 5A is a diagram illustrating an example of architecture to which a local breakout (LBO) method is applied during roaming.
Figure 5B:
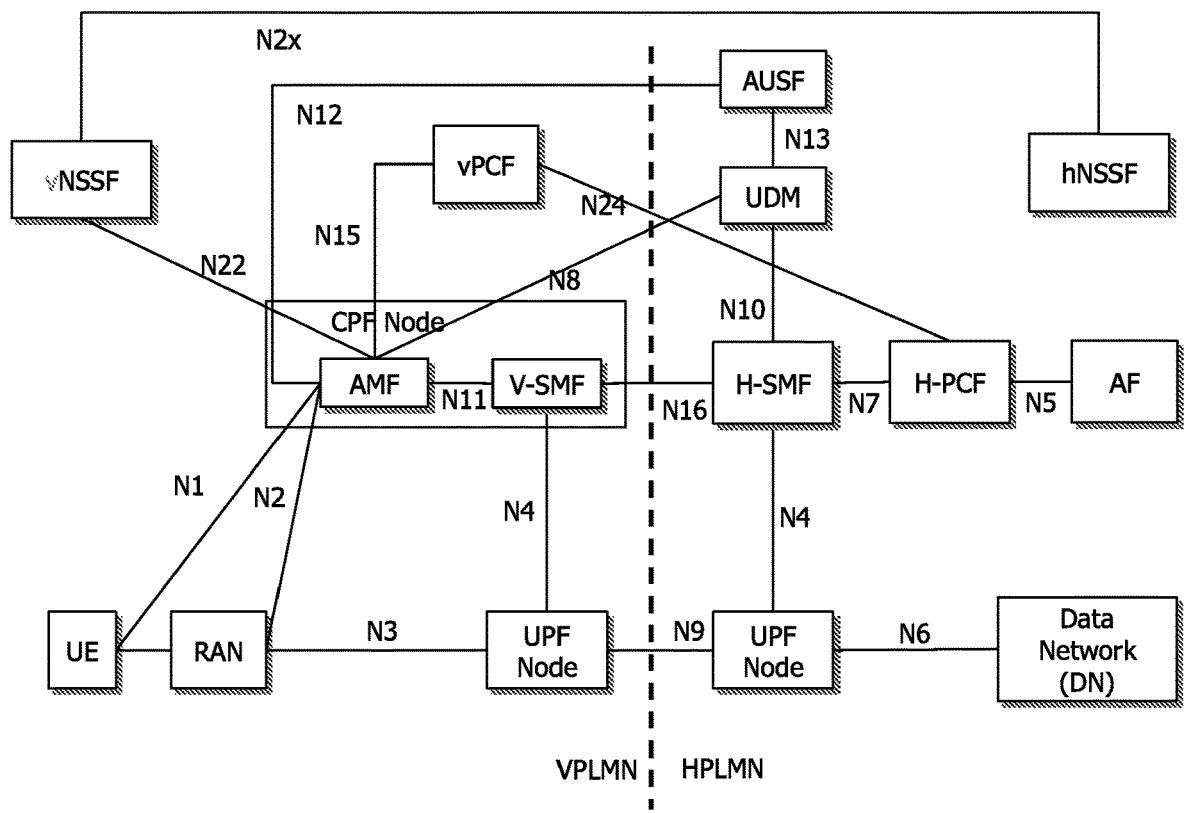
FIG. 5B is a diagram illustrating an example of architecture to which a home routed (HR) method is applied during roaming.
Figure 6A:
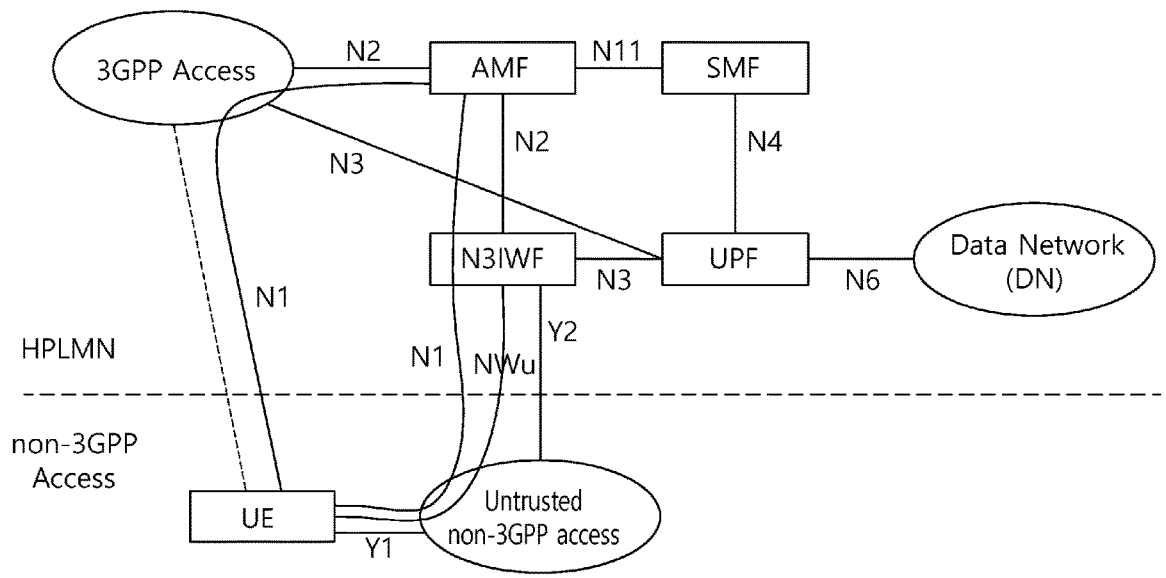
FIGS. 6A to 6F illustrate architectures for offloading data to a non-3GPP network.
Figure 6B:
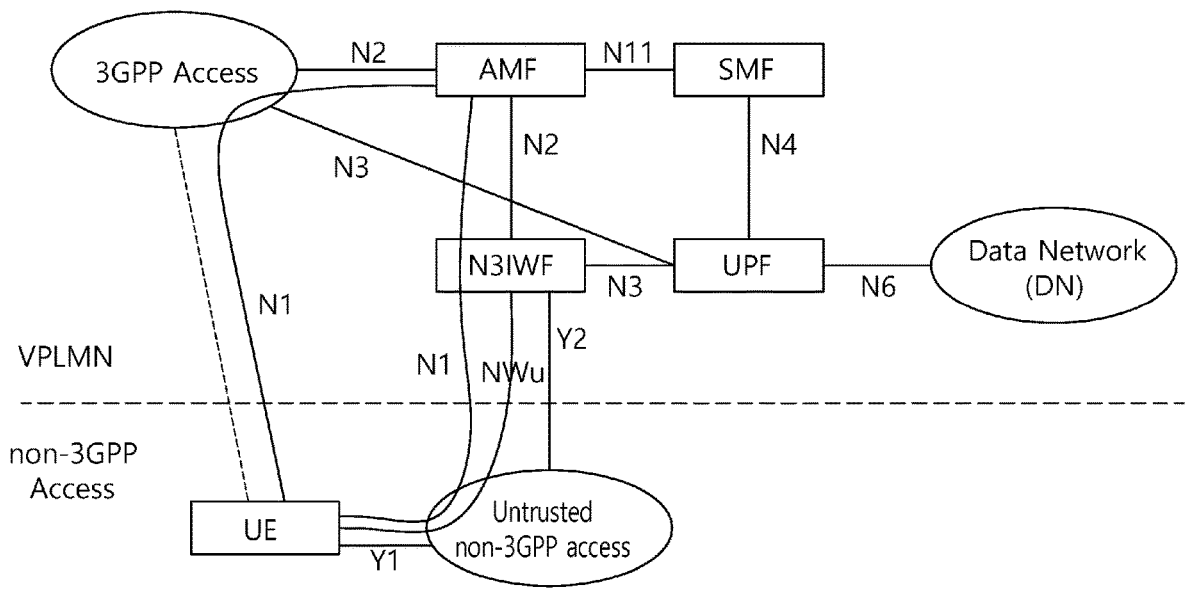
Figure 6C:
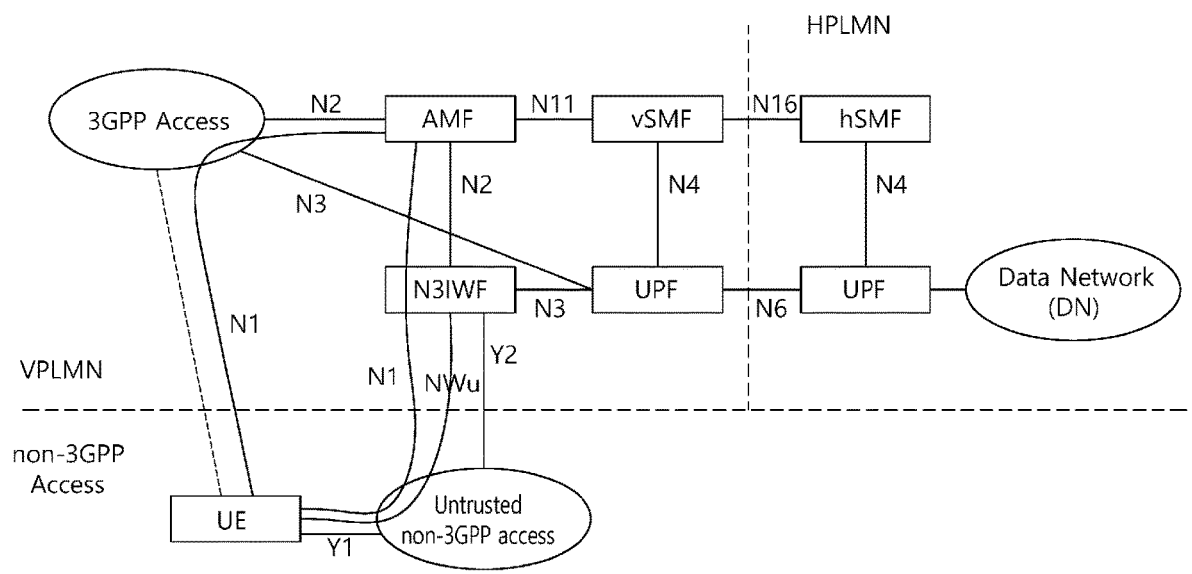
Figure 6D:
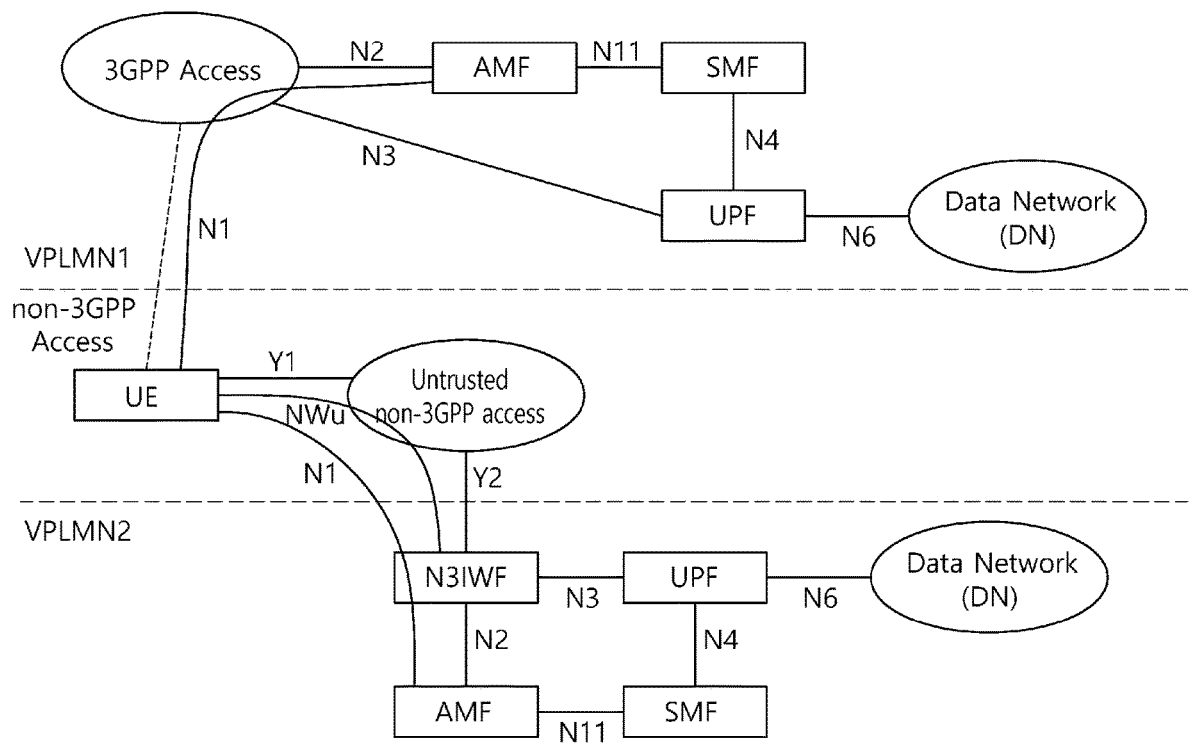
Figure 6E:
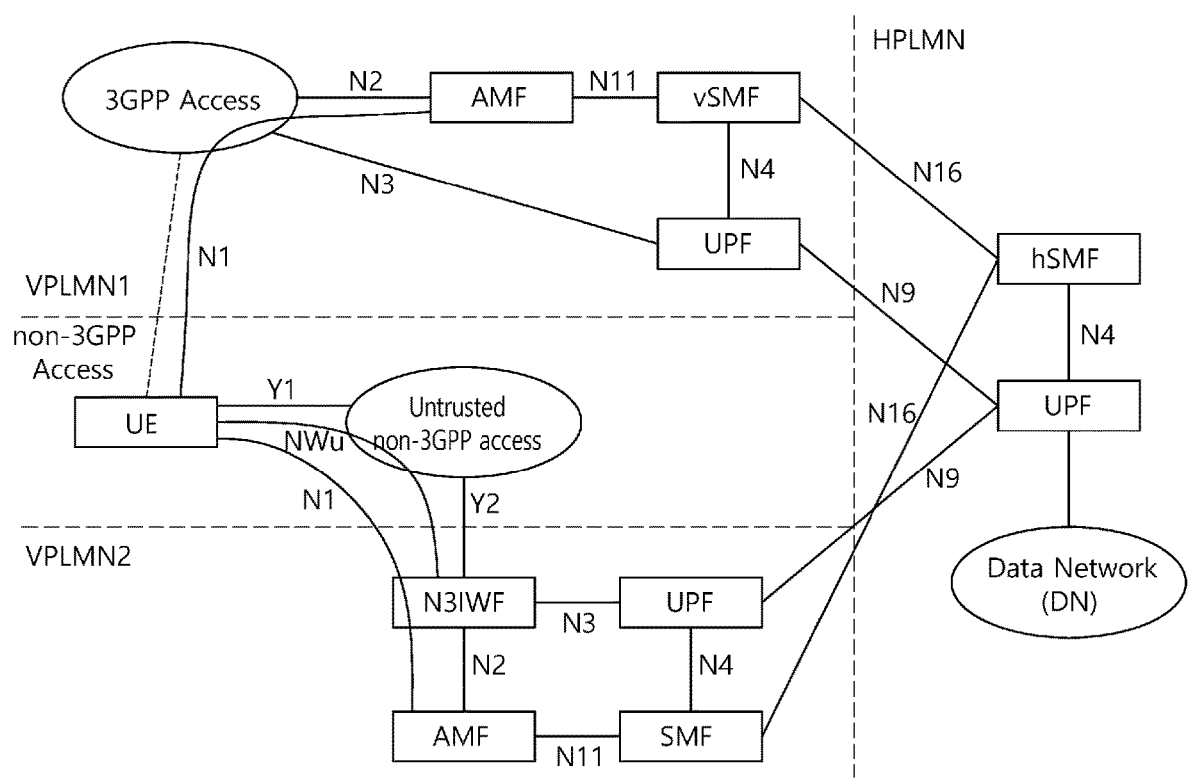
Figure 6F:
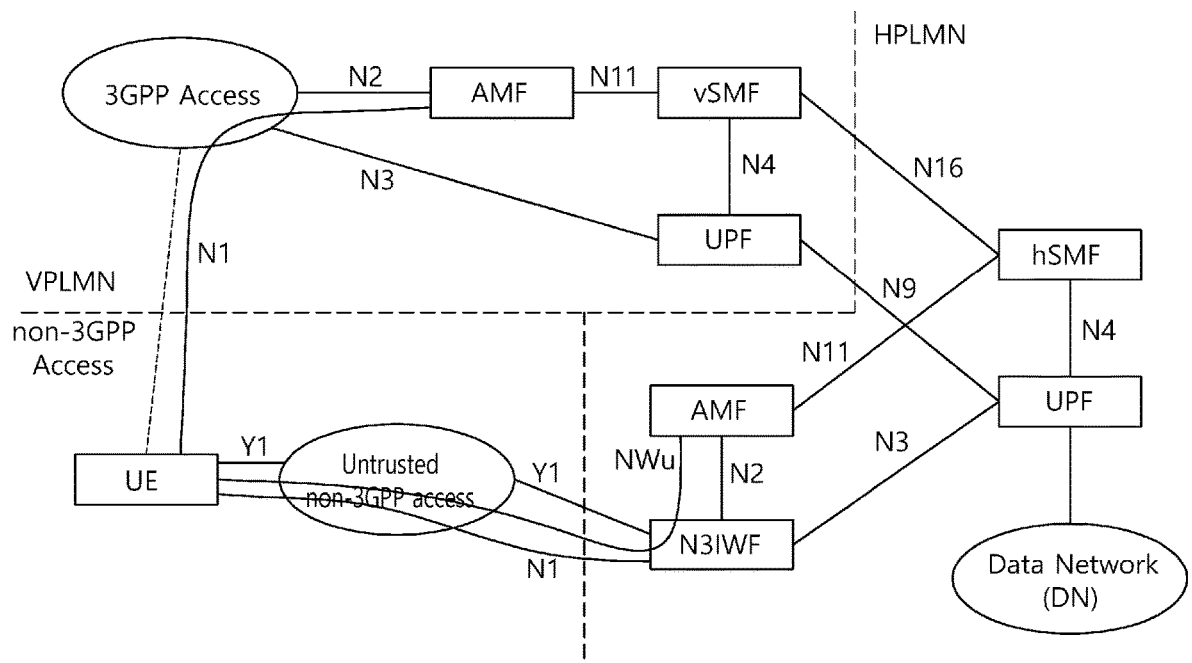

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the spirit of the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the spirit of the disclosure readily understood, but not should be intended to be limiting of the disclosure. It should be understood that the spirit of the disclosure may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the disclosure with reference to the accompanying drawings.

UE/MS is an abbreviation of User Equipment/Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A Serving gateway (Serving GW) is a network node of an EPS network which performs functions, such as mobility anchor, packet routing, idle mode packet buffering, and triggering an MME to page UE.

An eNodeB is an eNodeB of an Evolved Packet System (EPS) and is installed outdoors. The cell coverage of the eNodeB corresponds to a macro cell.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

An Access Point Name (APN) is the name of an access point that is managed in a network and provides to UE. That is, an APN is a character string that denotes or identifies a PDN. Requested service or a network (PDN) is accessed via P-GW. An APN is a name (a character string, e.g., 'internet.mnc012.mcc345.gprs') previously defined within a network so that the P-GW can be searched for.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

NAS (Non-Access-Stratum): A higher stratum of a control plane between a UE and an MME. The NAS supports mobility management, session management, IP address management, etc., between the UE and the network.

PLMN: as an abbreviation of Public Land Mobile Network, means a network identification number of a mobile communication provider. In roaming case of the UE, the PLMN is classified into a home PLMN (HPLMN) and a visited PLMN (VPLMN).

DNN: as an abbreviation of a data network name, means an access point for management in a network, similarly to an APN, and is provided to a UE. In the 5G system, the DNN is used equivalently as the APN.

NSSP (Network Slice Selection Policy): used by a UE for mapping an application and Session Network Slice Selection Assistance Information (S-NSSAI)

<Session and Service Continuity>

A new mobile communication network provides various modes to support session and service continuity (SSC).

1) SSC Mode 1

In a protocol data unit (PDU) session establishing process, a UPF operating as a PDU session anchor is maintained regardless of an access technology (that is, an access type and a cell). In the case of an IP-type PDU session, IP continuity is maintained regardless of movement of a UE. SSC Mode 1 may be applied to any PDU session type and also applied to any access type.

2) SSC Mode 2

If a PDU session has a single PDU session anchor, a network may trigger release of the PDU session and instruct a UE to establish the same PDU session. In the new PDU session establishing process, a UE operating as the PDU session anchor may be newly selected. SSC Mode 2 may be applied to any PDU session type and also applied to any access type.

3) SSC Mode 3

In regard to a PDU session for SSC Mode 3, before releasing connectivity between a UE and a previous PDU session anchor, a network may allow connectivity establishment of a UE using a new PDU session with respect to the same data network. If a trigger condition is applied, the network may determine whether to select an appropriate PDU session anchor for the new condition, that is, a UPF. SSC Mode 3 may be applied to any PDU session type and also applied to any access type.

4) SSC Mode Selection

In order to determine a type of SSC mode regarding an application of a UE or an application group of the UE, an SSC mode selection policy may be used.

An operator may provide the UE with the SSC mode selection policy. The policy may include one or more SSC mode selection policy rules.

Figure 7:
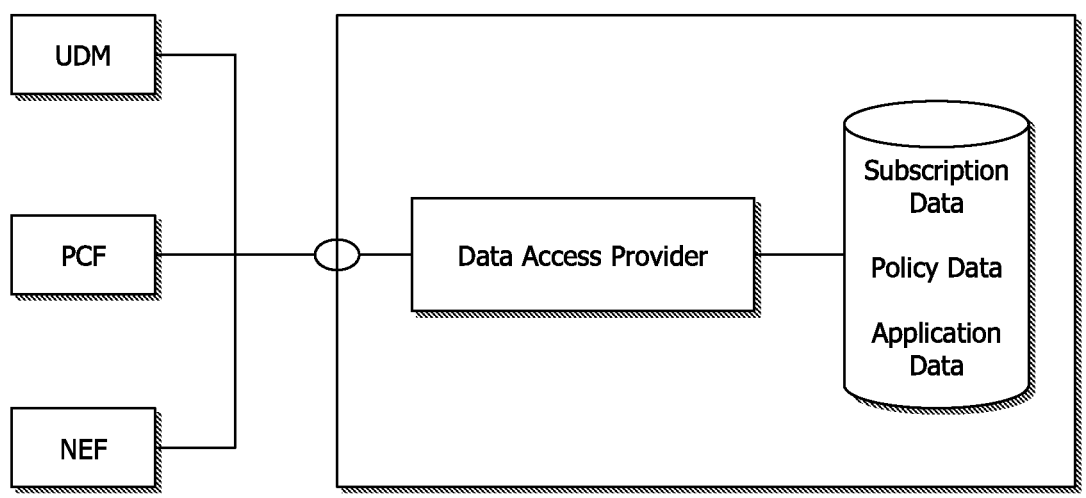
FIG. 7 illustrates a data storage architecture.

FIG. 7 illustrates a data storage architecture.

As illustrated in FIG. 7, a 5G system may allow a Unified Data Management OUDM), a Policy Control Function (PCF), and a Network Exposure Function (NEF) to store, in a Unified Data Repository (UDF), data which is, for example, subscriber information, policy data according to the UDM and the PCF, AF request information for the UE by the NEF, and the like. The UDR may be positioned in each PLMN.

<Registration Procedure>

In order to enable mobility tracking and data reception, and receive a service, a UE may need to be authorized. To this end, the UE needs to be registered in a network. The registration procedure is performed when the UE needs to perform initial registration with respect to a 5G system. In addition, the registration procedure is performed when the UE performs periodic registration update, when the UE moves to a new tracking area (TA) in an idle mode, and when the UE needs to perform periodic registration update.

During the initial registration procedure, ID of the UE may be obtained from the UE. The AMF may transmit PEI (IMEISV) to the UDM, the SMF, and the PCF.

Figure 8:
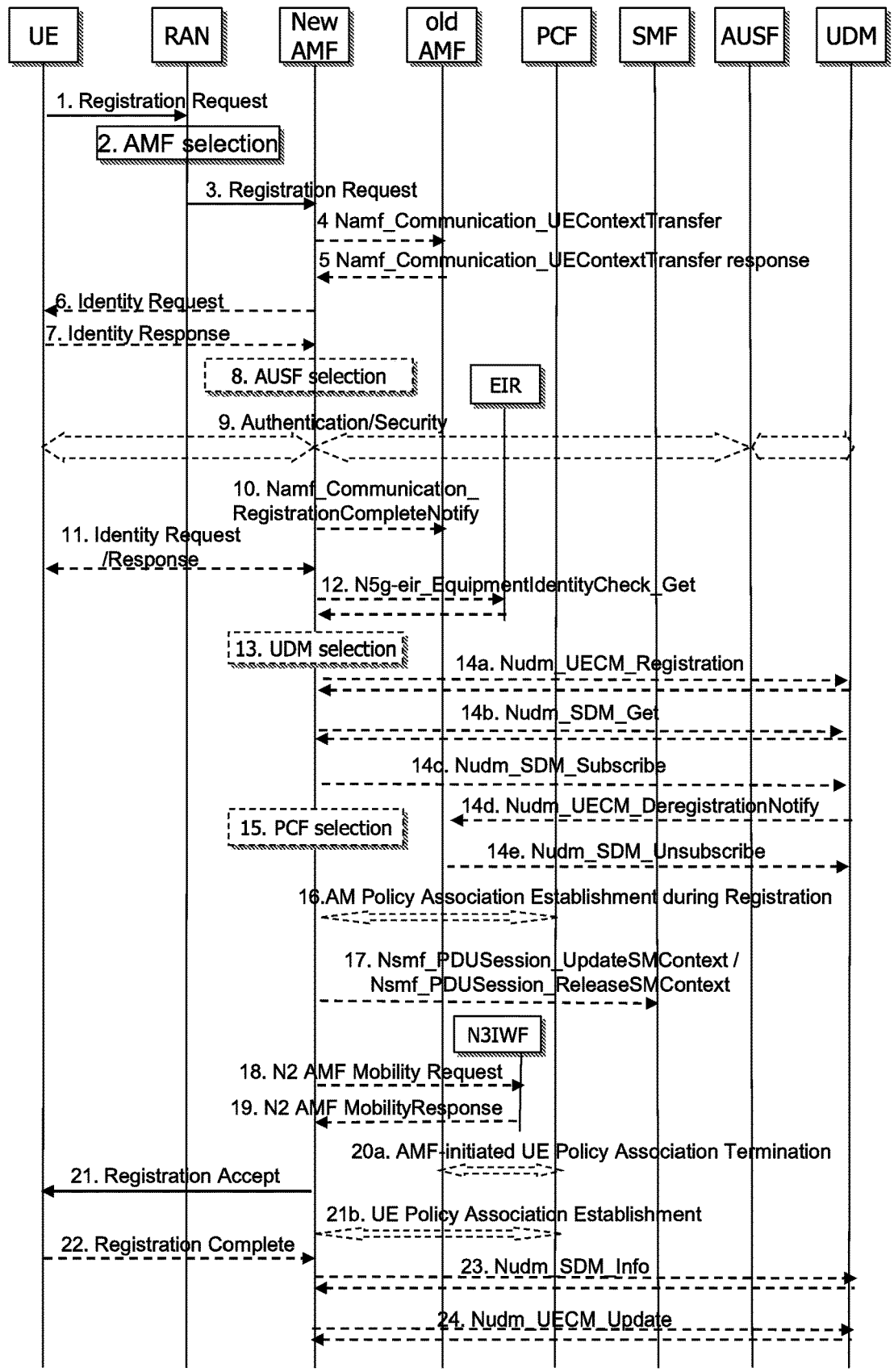
FIG. 8 is a signal flowchart illustrating an exemplary registration procedure.

FIG. 8 is a signal flowchart illustrating an exemplary registration procedure.

1) a UE may transmit an AN message to a RAN. The AN message may include an AN parameter and a registration request message. The registration request message may include information on a registration type, a subscriber permanent ID or temporary user ID, a security parameter, NSSAI, 5G capability of the UE, a PDU session state, and the like.

In the case of a 5G RAN, the AN parameter may include SUPI or temporary user ID, a selected network, and NSSAI.

The registration type may indicate whether the UE is in "initial registration" state (indicating that the UE is in a non-registered state), in "mobility registration update" state (indicating that the UE is in a registered state and starts the registration procedure due to mobility), or in "periodic registration update" state (indicating that the UE is in a registered state and starts the registration procedure due to periodic update timer expiration). If the temporary user ID is included, the temporary user Id indicates the last serving AMF. When the UE has been already registered through a non-3GPP access in a PLMN of 3GPP access and another PLMN, the UE may not provide UE temporary ID allocated by the AMF during the registration procedure through the non-3GPP access.

The security parameter may be used for verification and integrity protection.

The PDU session state indicates a (previously configured) PDU session that can be used in the UE.

2) When SUPI is included or the temporary user Id does not indicate valid AMF, the RAN may select the AMF based on (R)AT and SSAI.

When the (R)AN is not able to select an appropriate AMF, a random AMF is selected according to a local policy and a registration request is transmitted to the selected AMF. When the selected AMF is not able to provide a service to the UE, the AMF may select another AMF that is more appropriate for the UE.

3) The RAN transmits N2 message to the new AMF. The N2 message includes a N2 parameter and a registration request. The registration request may include a registration type, a subscriber permanent ID or temporary user Id, a security parameter, NSSAI and MICO mode default setting, and the like.

When a 5G-RAN is used, the N2 parameter may include a location information regarding a cell in which the UE is camped, cell ID, and an RAT type.

If a registration type indicated by the UE is periodic registration update, the following processes 4 to 17 may not be performed.

4) The newly selected AMF may transmit an information request message, for example, Namf_Communication_UEContextTransfer, to the previous AMF.

When the temporary user ID of the UE is included in the registration request message and a serving AMF is changed after the last registration, the new AMF may transmit information request message including complete registration request information to the previous AMF in order to request SUPI and MM context.

5) The previous AMF transmits an information response message, for example, Namf_Communication_UEContextTransfer response, to the newly selected AMF. The information response message may include SUPI, MM context, and SMF information.

Specifically, the previous AMF may transmit an information response message including SUPI and MM context of the UE.

When the previous AMF includes information regarding an active PDU session, the previous AMF may cause SMF information, including ID of an SMF and PDU session ID, to be included in the information response message.

6) If the SUPI is not provided by the UE or not searched by the previous AMF, the new AMF may transmit an Identity Request message to the UE.

7) The UE transmits an identity response message including the SUPI to the new AMF.

8) The AMF may determine to trigger an AUSF. In this case, the AMF may select an AUSF based on the SUPI.

9) The AUSF may start verifying the UE and an NAS security function.

10) The new AMF may transmit a Namf_Communication_RegistrationCompleteNotify message to the previous AMF.

11) The new AMF may transmit an Identity Request message to the UE.

If PEI is not provided by the UE or not searched by the previous AMF, the Identity Request message may be transmitted to allow the AMF to search for the PEI.

12) The new AMF verifies ID.

13) If the following process 14 is performed, the new AMF may select UDM based on SUPI.

14) The new AMF performs a registration procedure in UDM.

15) The new AMF may select a PCF based on the SUPI.

The new AMF performs Policy Association Establishment through a PCF.

17) The new AMF transmits a PDU Session Update SM Context message or a PDU Session Release SM Context message to the SMF.

18-19) The new SMF transmits an AMF Mobility Request message to N3IWF and receives a Mobility Response message from the AMF.

20) The previous AMF transmits a UE Context Termination Request to the PCF.

If the previous AMF previously requested to configure UE context in the PCF, the previous AMF may delete the UE context from the PCF.

21) The new AMF transmits a registration accept message to the UE. The registration accept message may include temporary user ID, a registration region, mobility restriction, a PDU session state, NSSAI, a periodic registration update timer, and an allowed MICO mode.

If the AMF allocate new temporary user ID, the temporary user Id may be further included in the registration accept message. The mobility restriction is applied to the UE, information indicating the mobility restriction may be further included in the registration accept message. The AMF may include the PDU session state of the UE in the registration accept message. The UE may remove a random internal resource associated with a PDU session indicated as not being active in the received PDU session state. If PDU session state information is contained in the Registration Request, the AMF may cause information indicating the PDU session state to the UE to be included in the registration accept message.

22) The UE transmits a registration complete message to the new AMF.

<PDU Session Establishment Procedure>

There may be two types of the PDU session establishment procedure.

A PDU session establishment procedure initiated by a UE

A PDU session establishment procedure initiated by a network. To this end, the network may transmit a device trigger message to an application(s) of the UE.

Figure 9:
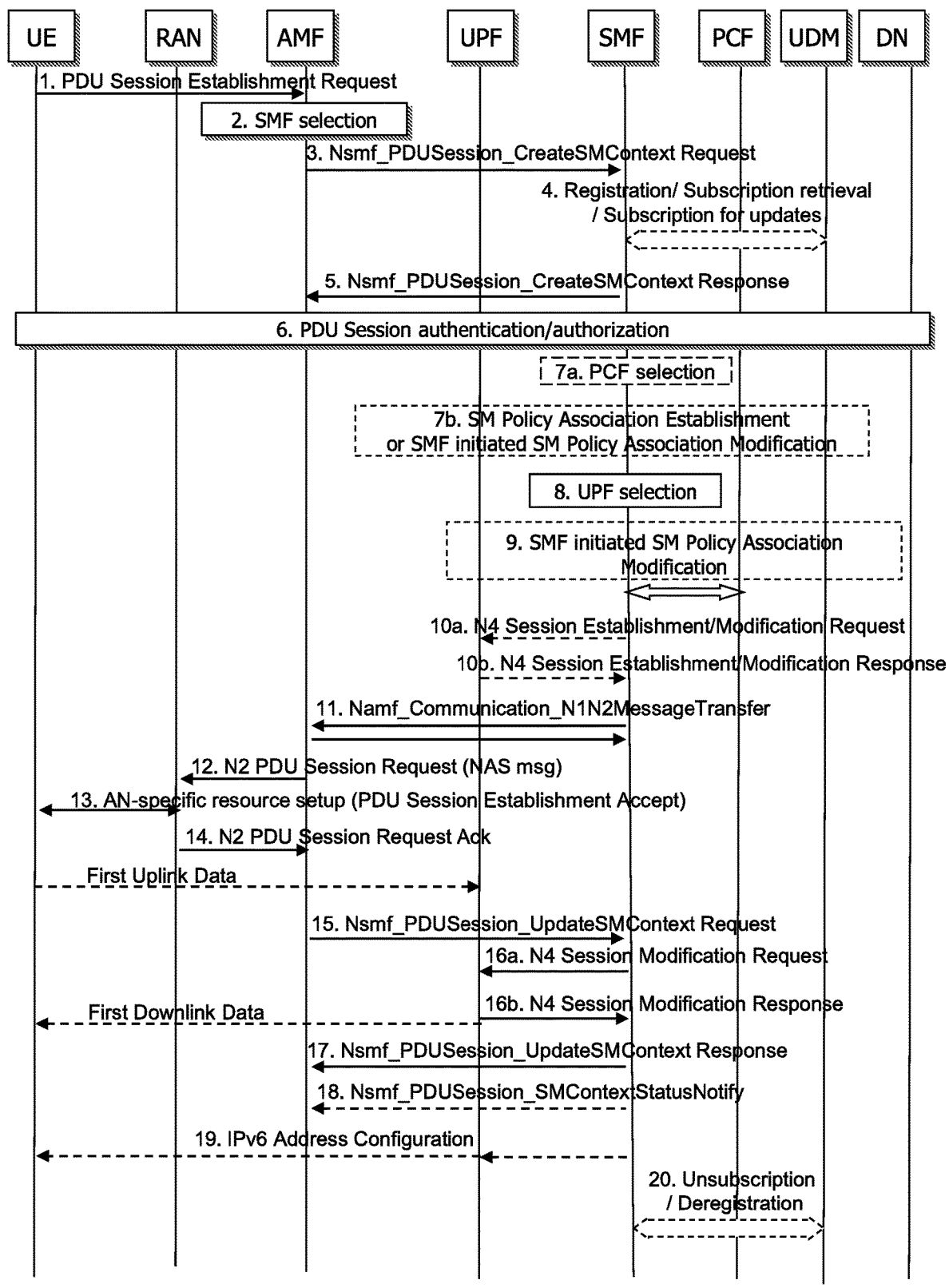
FIG. 9 is a flowchart illustrating an exemplary PDU session establishment procedure.

FIG. 9 is a flowchart illustrating an exemplary PDU session establishment procedure.

In the procedure illustrated in FIG. 9, it is assumed that the UE has been already registered in an AMF. Thus, the AMF assumes that user subscription data has been already obtained from UDM.

1) The UE transmits an NAS message to the AMF. The message may include S-NSSAI, a DNN, PDU session ID, a request type, N1 SM information, and the like.

In order to establish a new PDU session, the UE may generate new PDU session ID.

By transmitting a NAS message in which a PDU session establishment request message is included in the N1 SM information, the UE may start the PDU session establishment procedure which is to be initiated by the UE. The PDU session establishment request message may include a request type, an SSC mode, and a protocol configuration option.

When the PDU session establishment is to set a new PDU session, the request type indicates "initial request". However, where there is an existing PDU session between a 3GPP access and a non-3GPP access, the request type may indicate "existing PDU session."

The NAS message transmitted by the UE is encapsulated in the N2 message by a nAN. The N2 message is transmitted to an AMF, and may include user location information and access technology type information.

N1 SM information may include an SM PDU DN request container in which information regarding PDU session verification by an external DN is included.

2) If the request type indicates "initial request" and if the PDU session Id has not been used for an existing PDU session of the UE, the AMF may determine that the message corresponds to a request for a new PDU session.

If the NAS message does not include S-NSSAI, the AMF may determine default S-NSSAI for the requested PDU session according to UE subscription. The AMF may store the PDU session ID and SMF ID in association with each other.

3) The AMF transmits an SM context request message to the SMF.

4) The SMF transmits a subscriber data request message to UDM. The subscriber data request message may include subscriber permanent ID, and a DNN.

In the above process, if the request type indicates "existing PDU session", the SMF may determine that the request is triggered by handover between a 3GPP access and a non-3GPP access. The SMF may identify the existing PDU session based on the PDU session If the SMF has not searched for SM-related subscription data regarding a DNN-related UE, the SMF may request subscription data.

He UDM may transmit a subscription data response message to the SMF.

The subscription data may include information regarding a verified request type, a verified SSC mode, and a default QoS profile.

The SMF may verify whether a UE request complies with a user subscription and local policy. Alternatively, the SMF may reject the UE request through NAS SM signaling (including related SM reject reason) transmitted by the AMF, and the SMF notifies the AMF of information indicating that the PDU session ID needs to be regarded as being released.

5) The SMF transmits a Create SM Context Response message to the AMF.

6) A PDU session verification/authorization procedure is proceeded with.

7a) If dynamic PCC is distributed, the SMF selects a PCF.

7b) In order to obtain a default PCC rule regarding a PDU session, the SMF may start PDU-CAN session establishment toward the PCF. If the request type in the process 3 indicates "existing PDU session", the PCF may instead start PDU-CAN session modification.

7) If the request type in the process 3 indicates "initial request", the SMF selects an SSC mode regarding a PDU session.

8) The SMF may select even a UPF. In the case of a request type IPv4 or IPv6, the SMF may allocate an IP address/prefix regarding the PDU session.

9) The SMF starts an SM policy association modification procedure.

If the request type indicates "initial request" and the process 5 has not been performed, the SMF may start a N4 session establishment procedure using the selected UPF, and otherwise the SMF may start a N4 session modification procedure using the selected UPF.

The SMF transmits a N4 session establishment/modification to the UPF. The SMF may provide rules regarding detection of a packet to be installed in the UPF with respect to the PDU session, execution of the packet, and reporting. When the SMF allocates CN tunnel information, the CN tunnel information may be provided to the UFP.

10b) By transmitting an N4 session establishment/modification response message, the UPF may respond. If the CN tunnel information is allocated by the UPF, the CN tunnel information may be provided to the SMF.

The SMF transmits an N1N2 Message Transfer message to the AMF. The message may include PDU session ID and N2 SM information. The N2 SM information may include PDU session ID, QFI, a QoS profile, CN tunnel information, S-NSSAI information obtained from allowed NSSAI, session-AMBR, a PDU session type, and the like.

12) The AMF transmits an N2 PDU session request message to a RAN. The message may include N2 SM information and an NAS message. The NAS message may include PDU session ID and a PDU session establishment accept message.

The AMF may transmit an NAS message including the PDU session ID and the PDU session establishment accept message. In addition, the AMF transmits the N2 PDU session request message including the N2 SM information received from the SMF.

13) The RAN may exchange specific signaling with a UE related to the information received from the SMF.

The RAN allocates RAN N3 tunnel information with respect to a PDU session.

The RAN transmits the NAS message, provided in the process 10, to the UE. The NAS message may include PDU session ID and N1 SM information. The N1 SM information may include a PDU session establishment accept message.

Only when a necessary RAN resource is configured and allocation of RAN tunnel information is completed successfully, the RAN transmits the NAS message to the UE.

14) The RAN transmits a 2 PDU session request acknowledgment (Ack) to the AMF.

15) The AMF may transmit an SM request message to the SMF. The SM request message may include N2 SM information. Here, the AMF may transmit, to the SMF, the N2 SM information received from the RAN.

16a) If an N4 session regarding the PDU session has not been configured, the SMF may start an N4 session establishment procedure together with the UPF. Otherwise, the SMF may start an N4 session modification procedure using the UPF. The SMF may provide AN tunnel information and CN tunnel information. The CN tunnel information may be provided only when the SMF selects the CN tunnel information in the process 8.

16b) The UPF may transmit an N4 session establishment/modification response message to the SMF.

17) The SMF may transmit an SM response message to the AMF. After this process, the AMF may transmit a relevant event to the SMF. The event occurs at handover when RAN tunnel information is changed or when the AMF is repositioned.

18) The SMF transmits information to the UE through the UPF. Specifically, in the case of PDU Type IPv6, the SMF may generate IPv6 Router Advertisement and transmit IPv6 Router Advertisement to the UE through N4 and the UPF.

18) The SMF transmits an SM Context Status Notify message to the AMF.

19) The SMF transmits an IP address configuration through the UPF.

<Multi-Access (MA) PDU Session>

In an existing technology, an MA PDU session may be generated by bundling two separate PDU sessions established through different accesses.

Figure 10:
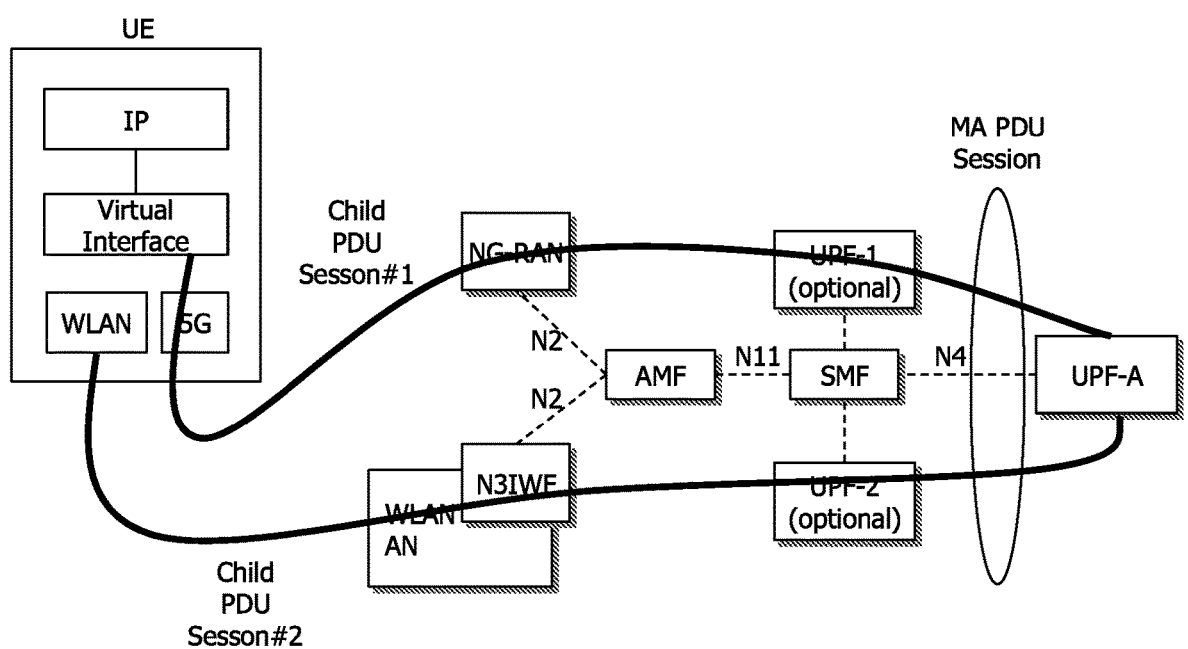
FIG. 10 illustrates an example in which an MA PDU session is generated according to an existing technology.

FIG. 10 illustrates an example in which an MA PDU session is generated by an existing technology.

The MA PDU session includes at least two PDU sessions that are indicated as child PDU sessions in FIG. 10. One of the two PDU sessions is established on a 3GPP access, and the other one is established on an untrusted non-3GPP access (e.g., WLAN AN).

In the MA-PDU session, the child PDU sessions may share the following characteristics:
 (i) Common DNN;
 (ii) Common UPF anchor (UPF-A);
 (iii) Common PDU type (e.g., IPv6);
 (iv) Common IP addresses;
 (v) Common SSC mode; and
 (vi) Common S-NSSAI.

The MA-PDU session enables a multi-path data link between a UE and a UPF-A.

The MA-PDU session may be established through one of the following procedures.

(i) The MA-PDU session may be established through two separate PDU session establishment procedures, which are referred to as separate establishment.

(ii) The MA-PDU session may be established through one MA PDU session establishment procedure. That is, two child PDU sessions are established at the same time. This is referred to as associated establishment.

The child PDU sessions may have the same IP address.

After the MA-PDU session is established, Session Management (SM) signaling regarding the MA PDU session may be transmitted and received through a random access.

A. Separate Establishment of MA PDU Session

Two child PDU sessions may be established through two separate PDU session establishment procedures. For example, a UE may establish a first PDU session on a 3GPP access and then establish a second PDU session on a non-3GPP access. The two PDU sessions may be linked to each other and accordingly become child PDU sessions of the MA PDU sessions.

The linked PDU session may be provided to a 5G core network (5GC). The 5GC may link the second PDU session to the "linked" PDU session and designate the two PDU session as child PDU sessions of the MA PDU sessions.

Since the "linked" PDU session is provided to the 5GC, the UE may not need to request specific values for a DNN, S-NSSAI, a SSC mode, a PDU type, and the like. The second PDU session may use the same values of the "linked" PDU session.

"A request type in an establishment request message for establishing the second PDU session may be set as "initial request." When the 5GC receives a PDU session establishment request message with "linked" PDU session and request type="initial request" set therein, the 5GC may interpret such that the request is to establish an MA PDU session and may link the request PDU session to an existing "linked" PDU session. Alternatively, if the initial request" is not appropriate as the request type, a new request type may be used.

B. Combined Establishments

Two child PDU sessions may be established at the same time through one procedure. Such one procedure may be referred to as an MA PDU session establishment procedure by a UE request. When the UE wishes to establish an MA PDU session while the UE has been already registered in the 5GC through two accesses, the aforementioned procedure may be useful. Instead of performing two separate PDU session establishment procedures, the UE may perform one MA PDU session establishment procedure to establish two child PDU sessions.

Figure 11:
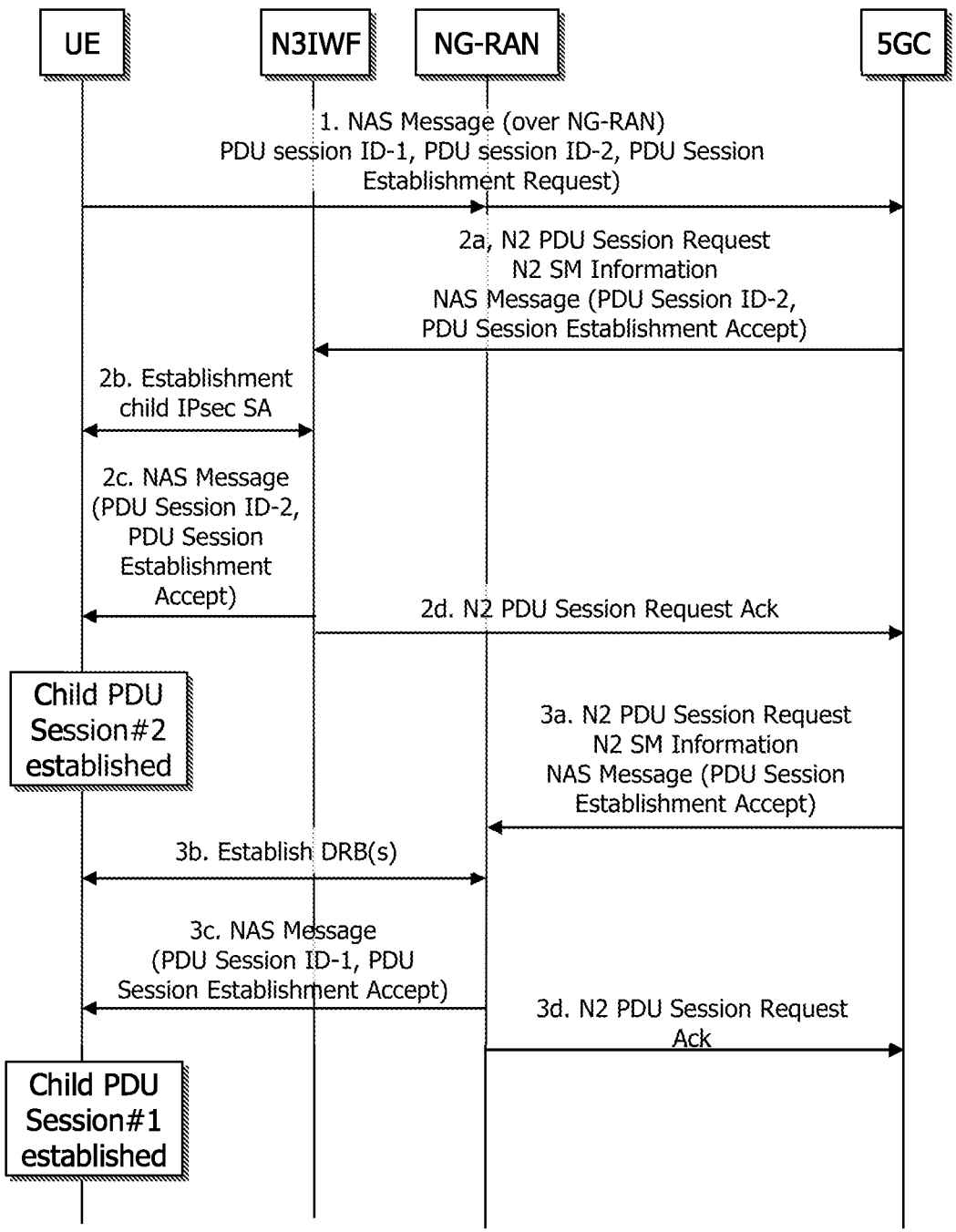
FIG. 11 illustrates an example in which a combined establishment procedure for an MA PDU session is performed according to an existing technology.

FIG. 11 illustrates an example in which a combined establishment procedure for an MA PDU session is performed according to an existing technology.

The combined establishment procedure illustrated in FIG. 11 illustrates an MA PDU session establishment requested by a UE. Two child PDU session establishment procedures have different PDU session ID. In the example illustrated in FIG. 9, the child PDU session on the 3GPP access is indicated as Session ID_1, and the child PDU session on the non-3GPP access is indicated as Session ID_2. The SMF of the 5GC triggers two N2 PDU session establishment procedures. The UE may receive a PDU session establishment accept message regarding Session ID_1 through the 3GPP access, and receive a PDU session establishment accept message regarding Session ID_2 through the non-3GPP access. The SMF may anchor all of the two PDU sessions passing through the same UPF, and assign the same IP address to the two PDU sessions.

<Problems to Be Addressed by the Disclosure of the Specification>

I. First Problem

According to Network-Based IP Flow Mobility (NBI-FOM) proposed in an Evolved Packet System (EPS), when updating an NBIFORM rule, a UE or a network may update Quality of Service (QoS) information simultaneously with the updating the rule. In addition, the NFIFORM rule is not applied unilaterally by the UE or the network but is applied after the UE and the network confirms the rule.

Accordingly, in the case where the UE/network transmits the NBIFORM rule and the QoS information at the same time through update signaling, if the UE or the network does not accept the rule, an operation of updating unnecessary QoS information is performed. For example, in the case where the UE has a multi-access (MA) PDU session, if an SMF wishes to transfer IP flow #1 being transmitted on a non-3GPP access to the 3GPP access, the UE may set up a QoS flow for the IP flow #1 while transmitting an Access Traffic Steering, Switching and Splitting (ATSSS) through the 3GPP access. In this case, if the ATSSS rule is rejected by the UE, this may lead to a situation in which a QoS flow for the IP flow #1 is created on the 3GPP unnecessarily even though the IP flow #1 is continuously transmitted to the non-3GPP access.

In addition, in the case where a reflective QoS is used although the ATSSS rule is accepted, if an uplink packet is generated prior to a downlink packet, there is a problem in which a QoS cannot be applied to the uplink packet. In addition, in order to apply the reflective QoS to the 3GPP access, a Reflective QoS Attribute (RQA) needs to be transmitted to a RAN so as to use a Service Data Adaptation Protocol (SDAP) header. Yet, in the case of transferring a 3GPP access flow, if a RQA is not transmitted to the RAN even though a downlink packet is first generated, it is not possible to apply the reflective QoS. In addition, when the RQA is transmitted to ATSSS-rule update and the UE rejects the ATSSS rule, the SDAP header is unnecessarily used in the RAN, resources may be wasted. In addition, in the case where the UE updates the ATSSS rule, there is a problem that it is necessary to transmit additional signaling for the RQA to the RAN.

II. Second Problem

In 5GS, a QoS of an Access Network (AN) and a QoS of a Core Network (CN) are separated. In the CN, QoS differentiation is performed based on QoS Flow ID (QFI) included in an N3 header, and the same QFI may receive the same QoS process. In this case, flows having the same QFI (that is, the same QoS process) are referred to as QoS flows, and each QoS flow are mapped to a radio resource in the AN to perform the QoS process in the AN. In this case, the method for mapping a QoS flow to an AN resource (e.g., a radio bearer and an IPsec tunnel) at the AN is not set and depends on implementation of the AN. Multiple QoS flows may be mapped to one AN resource. Such mapping information is transmitted to the UE through AN-specific signaling (e.g., RRC reconfiguration and IKE signaling). If there is a QoS flow having no mapping information, the QoS flow is transmitted to a default AN resource (e.g., a default radio bearer). Based on a QoS rule, the UE determines a QoS flow to which a created traffic is to be transmitted.

When the UE enters a connected state from an idle state, AN resources mapped to all QoS flows are generated. Accordingly, when there is a QoS rule and the UE is in the connected state, the UE may consider that all the AN resources has been set up and may transmit a traffic without special signaling.

However, in the case of a MA-PDU session, a legacy QoS framework does not operate well.

In the MA-PDU session, a data flow of one side access may be transferred to the other side access by a steering rule. In this case, when there is no mapping information, the UE performs transmission using a default AN resource and thus the UE is not allowed to be aware of whether an AN resource mapped to the QoS rule has been set up.

<Disclosures of the Specification>

A first disclosure of the specification proposes methods for addressing the aforementioned first problem. A second disclosure of the specification proposes methods for addressing the aforementioned second problem.

I. First Disclosure

First Method of the First Disclosure: A method for always creating the same QoS flow toward both side accesses.

The first method is a method in which the same QoS flow is always created toward both side accesses.in a PDU session to which ATSSS is applied. In this case, it is possible to process a traffic only by updating the ATSSS without a QoS flow update. However, if this method is employed, a traffic may actually go toward one side, and thus, resources of the UE and the network may not be used efficiently (a Guaranteed Bit Rate (GBR) QoS flow needs to use a radio resource, and thus, it is difficult to use the GBR QoS flow.).

In addition, in a 3GPP access needs to use a SDAP header to use a reflective QoS, and this has a problem that an additional radio resource needs to be used. In particular, in the case of a QoS flow to which a reflective QoS is applied, if there is no downlink packet for a predetermined period of time, a reflective QoS timer is expired and the reflective QoS rule is deleted, and thus, a method for maintaining the QoS rule is necessary. That is, if the reflective QoS is used at one side access, an explicit QoS rule rather than a reflective QoS needs to be given to the other side access for management. However, if a QoS flow needs to move frequently or when one QoS flow is used together multiple IP flows and thus needs to be used all the time (e.g., in the case where a default QoS flow uses the same QFI at the 3GPP and non-3GPP accesses), a QoS may be ensured easily using the above-described method.

I-2. Second Method of the First Disclosure; Method for Transmitting an Indication Indicating Application of an Additional Rule after ATSSS Rule Update The second method is a method in which a setup for a QoS flow at a UE/network is performed through additional signaling after update of an ATSSS rule and then additional signaling is transmitted to apply the ATSSS rule. This method is a method that is applicable both of an obvious QoS rule and a reflective QoS.

Figure 12:
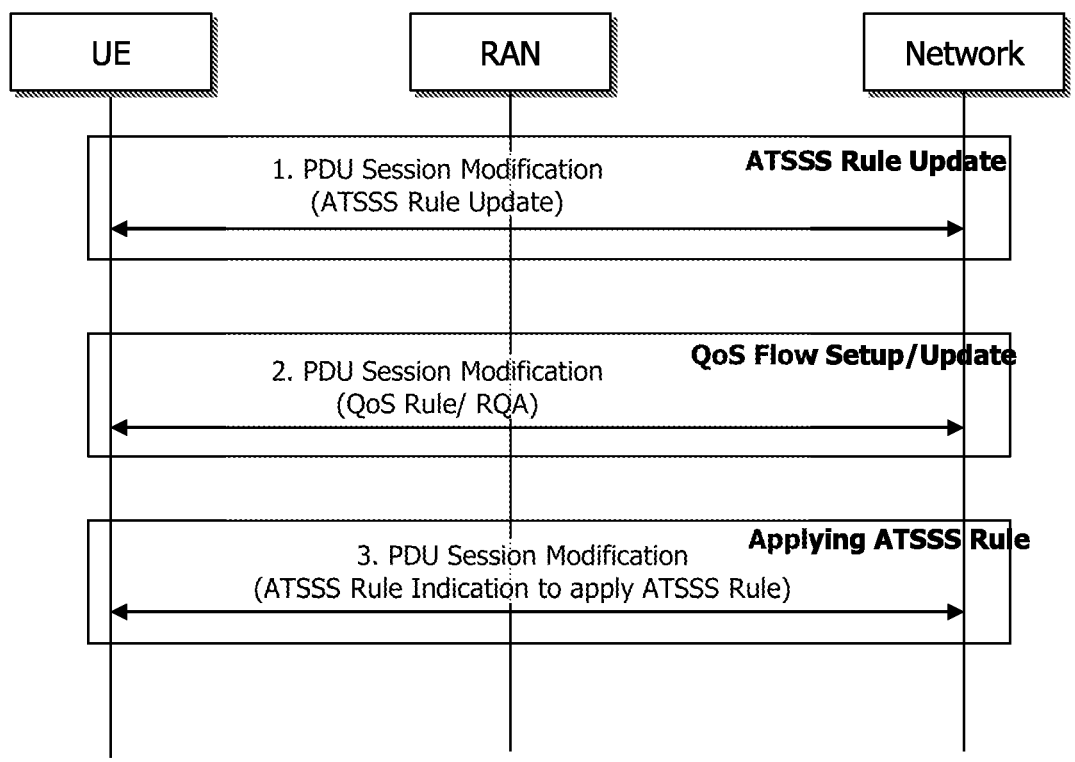
FIG. 12 is an exemplary signal flowchart of a second method of a first disclosure.

FIG. 12 is an exemplary signal flowchart of the second method of the first disclosure.

As illustrated in FIG. 12, signaling for updating an ATSSS rule, signaling for setting a QoS flow, and signaling for applying the ATSSS are transmitted respectively. As such, since the respective signals are transmitted separately, overheard regarding signaling may increase. If this method is employed, the signaling for setting up a QoS flow and the signaling for applying the ATSSS rule may use one procedure. For example, the process 3 in FIG. 12 may be performed together with the process 2.

I-3. Third Method of the First Disclosure: Method for Performing a Procedure for QoS Update Among ATSSS Rule Update Procedures This method is a method in which, when a UE/network accepts an ATSSS rule during an ATSSS update procedure, an additional procedure for updating a QoS rule and then a procedure for updating the ATSSS rule is performed after the QoS rule is updated.

Figure 13:
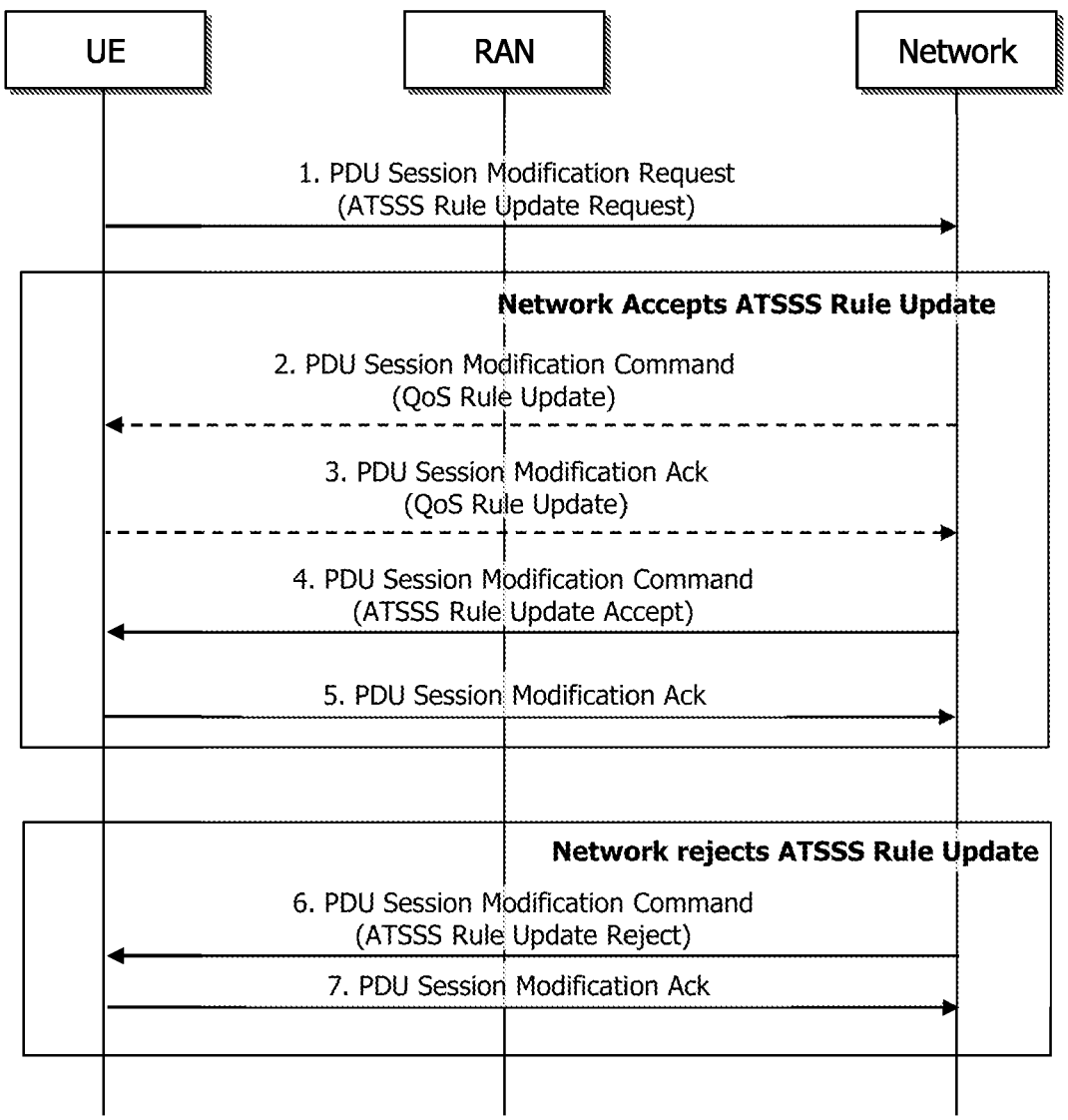
FIG. 13 is a signal flowchart illustrating a first embodiment of an ATSSS rule update procedure according to a third method of the first disclosure.

FIG. 13 is a signal flowchart illustrating a first embodiment of an ATSSS rule update procedure according to the third method of the first disclosure.

As illustrated in FIG. 13, in the process 1, a UE transmits a message including an ATSSS rule to be updated. When the network accepts the ATSSS rule, the network does not immediately transmit a response message regarding the process 1 but starts a new SM procedure (process 2 and process 3) to set up a new QoS flow for the updated ATSSS rule. After the QoS flow setup, the network transmits a response message regarding the process 1 in the process 4, and then starts applying the updated ATSSS rule. After receiving the message in the process 4, the UE transmits a response message regarding the received message and then starts applying the ATSSS rule. If the network rejects the ATSSS rule, the processes 2 to 5 are omitted and the process 6 regarding a response to the process 1 is immediately performed to inform that the ATSSS is rejected.

This scenario may be implemented through one procedure without an additional procedure as the process 2 is performed together with the process 4 and the process 3 is performed together with the process 5.

Figure 14:
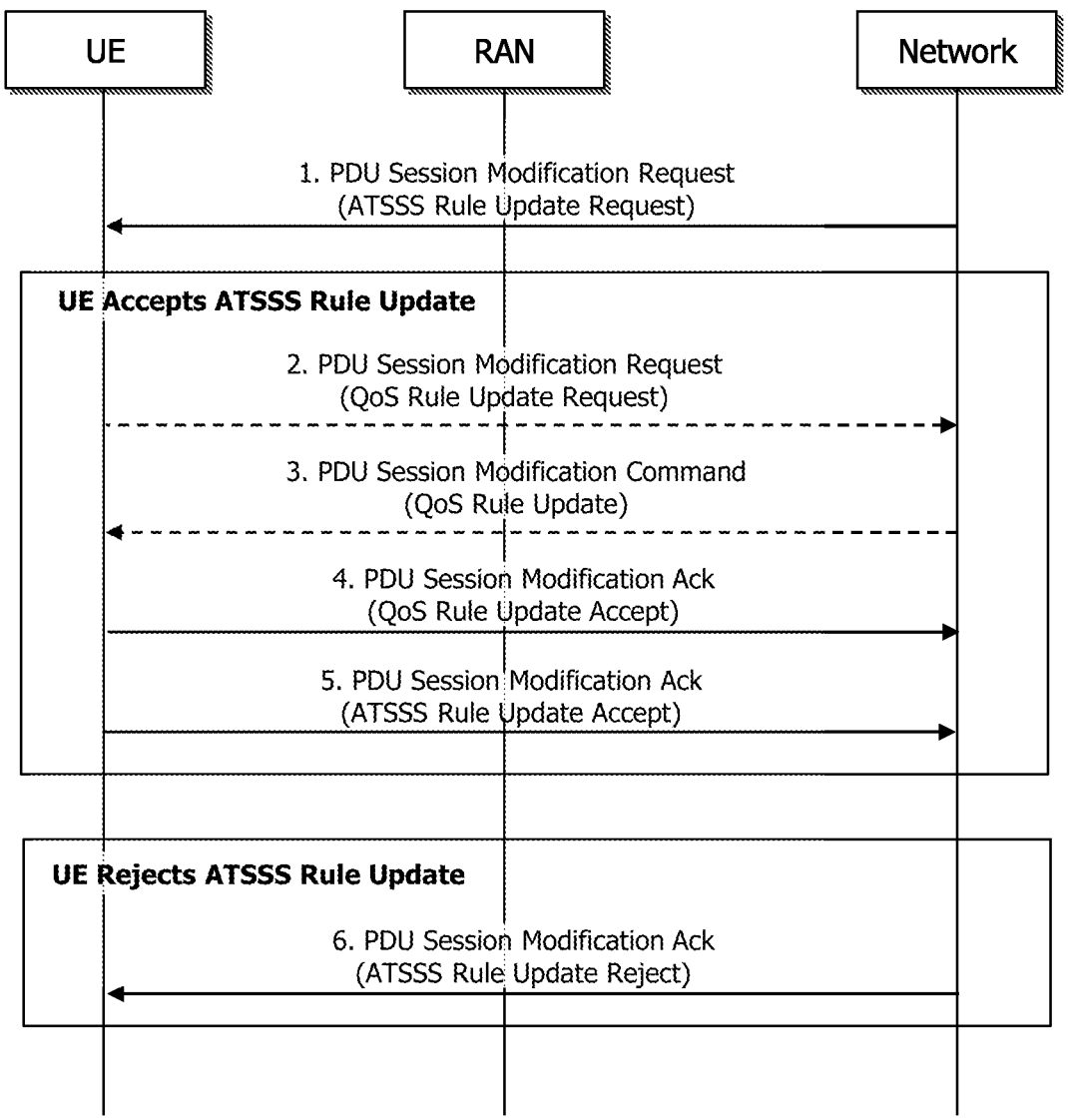
FIG. 14 is a signal flowchart illustrating a second example of an ATSSS rule update procedure according to the third method of the first disclosure.

FIG. 14 is a signal flowchart illustrating a second example of an ATSSS rule update procedure according to the third method of the first disclosure.

An ATSSS rule update procedure starting at a network may be performed as illustrated in FIG. 14. In the process 1 illustrated in FIG. 14, the network may transmit a message including an ATSSS rule to be updated. When a UE accepts the ATSSS rule, the UE may not immediately transmit a response regarding the step 1 to the network but may start a new SM procedure (that is, process 2 and process 4) for requesting setup of a new QoS flow for the ATSSS rule to be updated. After the QoS flow setup, the UE transmits a response message regarding the process 1 in process 5 and starts applying the updated ATSSS rule. After receiving the process 5, the network starts applying the ATSSS rule. If the network rejects the ATSSS rule, the processes 2 to 5 are omitted and the process 6 regarding a response to the process 1 is immediately performed to inform that the ATSSS is rejected.

Meanwhile, in the case of using a reflective QoS, when the network wishes to continue using the reflective QoS even in 3GPP access in a process of setting up a QoS flow, the network needs to transmit a RQA to an RAN. For example, the RQA may be transmitted to the RAN in the process 2 of FIG. 13 and the process 3 of FIG. 14.

In the case where only the reflective QoS is used or it is not necessary to perform explicit QoS rule update, the UE/network may not perform a procedure for setting up an additional QoS flow (e.g., the processes 2 and 3 of FIG. 13, and the processes 2 to 4 of FIG. 14). In this case, the corresponding procedure may be used to transmit only an ROQ to the RAN so as to use a QoS, but signaling may be reduced in the following method.

Figure 15:
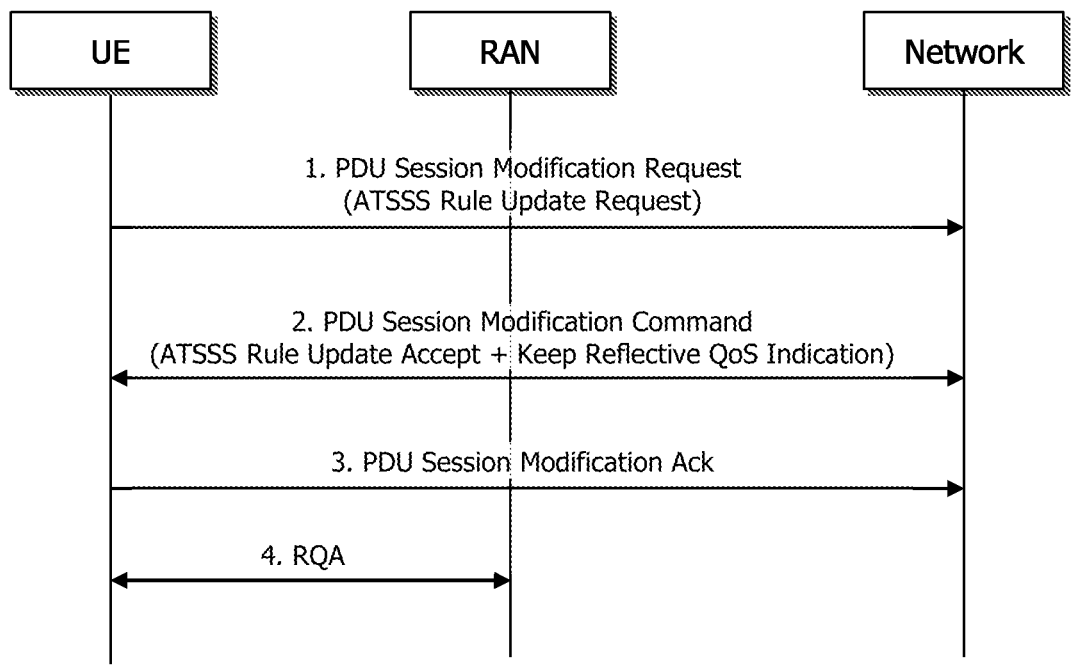
FIG. 15 is a signal flowchart illustrating a third example of an ATSSS rule update procedure according to the third method of the first disclosure.

FIG. 15 is a signal flowchart illustrating a third example of an ATSSS rule update procedure according to the third method of the first disclosure.

As illustrated in FIG. 15, in the case where a UE updates an ATSSS rule, if a network accepts the ATSSS rule, the network notifies the accept of the ATSSS to the UE and additionally transmits an indication indicating that it is allowed to continue using a reflective QoS. When the indication is received, the UE may inform, through RAN and AS signaling as in the process 4, that a reflective QoS is used for a QoS flow affected by the ATSSS rule. This process may be performed simultaneously with the process 3 or may be performed prior to the process 3. In addition, when the indication is received, the UE may allow a QoS rule generated and derived from a reflective QoS used in a previous access to be used even in another access to which the QoS rule is transferred intact. In addition, the UE may stop a reflective QoS timer regarding an operation for a reflective QoS for flows transferred by an ATSSS rule (an operation for maintaining a timer for the derived QoS rule), and may delete the derived QoS rule (the deletion should be done after a traffic is actually transferred). In this scenario, the network may not transmit an indication to the UE but transmits an RQA directly to a RAN to inform that a reflective QoS is used in the QoS flow.

Figure 16:
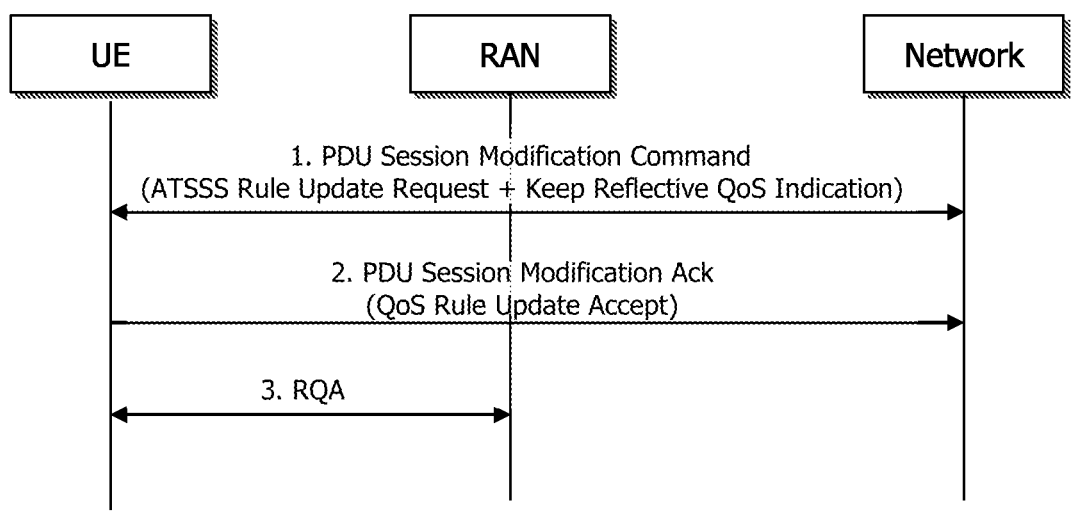
FIG. 16 is a signal flowchart illustrating a fourth example of an ATSSS rule update procedure according to the third method of the first disclosure.

FIG. 16 is a signal flowchart illustrating a fourth example of an ATSSS rule update procedure according to the third method of the first disclosure.

As illustrated in FIG. 16, in the case where a network updates an ATSSS rule, the network gives an updated ATSSS rule in the first process and further transmits an indication indicating that a reflective QoS needs to be used continuously. Upon receiving the indication, only when the ATSSS rule transmitted from the network is accepted, the UE may inform, through RAN and AS signaling, that a reflective QoS is used for a QoS flow affected by the ATSSS rule. This process may be performed simultaneously with the process 2 or may be performed prior to the process 2. In addition, when it is determined to accept the ATSSS rule after the indication is received, the UE may allow a QoS rule generated and derived from a reflective QoS used in a previous access to be used even in another access to which the QoS rule is transferred intact. In addition, the UE may stop a reflective QoS timer regarding an operation for a reflective QoS for flows transferred by an ATSSS rule (an operation for maintaining a timer for the derived QoS rule), and may delete the derived QoS rule (the deletion should be done after a traffic is actually transferred).

I-4. Method for Updating a QoS after ATTSS Rule Update

The fourth method is a method in which a QoS is updated after an ATSSS rule is updated. This method is performed without a special additional operation, and thus an additional procedure is not necessarily performed. In addition, a resource is not reserved to be used, as in the first method. However, for a predetermined period of time until a QoS is updated after the ATSSS rule is updated, a traffic not satisfying the QoS may occur. In particular, a GBR flow, a delay critical flow, and the like may lead to a problem in terms of QoS management. Accordingly, this method may be used when a flow transferred by the corresponding ATSSS rule is a flow, such as a non-GBR flow, which does not require special QoS process, II. Second Disclosure The second disclosure of the specification proposes methods for addressing the aforementioned second problem.

In the second disclosure, a steering rule may be interpreted as an ATSSS rule and may be interchangeable with the same. In the second disclosure, a data flow moving between a 3GPP access and a non-3GPP access may be interpreted as a traffic and a QoS flow, and may be interchangeable with the same. In the second disclosure, steering (or traffic steering) may be interpreted as including switching (or traffic switching) and splitting (or traffic splitting).

II-1. First Method of the Second Disclosure: Method for Using a Different QoS Rules for Each Access This method is a method in which an SMF gives a QoS rule for each access with respect to an MA-PDU session. In this method, if there is a QoS rule for a certain access, a necessary AN resource is set up together. Accordingly, in the case of transferring a data flow from one side access to on the other side access by a steering rule, if a QoS rule having to the same QFI as QFI used in a source access exists in a target access, a UE transfers the data flow to an SMF without signaling. In the case where the QoS rule having the same QFI does not exist, the UE request, from the SMF through a PDU session modification procedure, a QoS rule having the same QFI as the QFI used in the source access. In this method, a QoS rule is transmitted for each access, and thus, there is an advantage in that a different QoS flow for each access may be used with respect to the same data flow. To this end, the UE does not need to search for a QoS rule having the same QFI but needs to check whether there is a QoS rule including a packet filter with respect to a data flow to be transferred. Yet, in this process, unless a QoS in the source access is not mapped to a default QoS rule, the UE searches for a QoS rule in the target access, the QoS rule which has a packet filter including a data flow to be transferred, except for a default QoS rule. However, since both the UE and the network need to manage QoS rules for respective accesses, there is a problem that signaling increases and a maximum number of available QoS rules increases as well.

In this case, there may be a problem that, when transferring a certain data flow, the UE transfers the data flow using a QoS flow not desired by the network. For example, in the case where the data flow is using a GBR QoS flow in a non-3GPP access, if there is no data in a 3GPP access for a long time, the UE may be in CM-IDLE state in the 3GPP access. In this case, the network may release the GBR QoS flow in the 3GPP access, which results in deletion of the QoS rule of the UE connected to the GBR QoS flow. In this case, when it is necessary to transfer the data flow to the 3GPP access, the UE transmits the corresponding data flow using the default QoS rule or another QoS rule since there is no QoS rule for the GBR QoS flow. This is a result not desired by the network, and a QoS of the corresponding data flow is not ensured. Therefore, before transferring a traffic, the UE needs to transmit signaling to the SMF to inform the necessity of transferring the corresponding data flow. Upon receiving the signaling, the SMF may determine whether to give a new QoS rule to the UE and, if necessary, the SMF may give the new QoS rule to the UE. In this case, the SMF may be informed by the UE by sending a special traffic through a PDU session modification procedure of a second method described below or through a user plane.

II-2. Second Method of the Second Disclosure: Method for Using a Common QoS Rule for all Accesses This method is a method in which a QoS rule is used equally for all accesses. To this end, when transmitting the QoS rule, an SMF may inform an access for which an AN resource has been set up. In the case where a data flow is to be transferred to another access by a steering rule, if an AN resource has not been set up in a target access, an indication indicating that steering is wished to be performed through a PDU session modification procedure is transmitted to the SMF. When the indication is received, the SMF may transmit an N2 setup message to an AN so that the AN resource is set up. In this course, the SMF may transmit a PDU session command including an indication indicating that steering is allowed. After receiving a response to the PDU session modification request from the SMF, or after receiving a response to the PDU session modification request, which includes the indication indicating that steering is allowed, the UE transmits a data flow to the target access.

In this method, the SMF may not inform an access for which an AN resource has been set up with respect to a predetermined QoS, and may set always up an AN resource for both side accesses with respect to a non-GBR QoS flow and set up an AN resource for an access currently in use only with respect to a GBR QoS flow (if the both side accesses are currently used, it is possible to set up AN resources for the both side accesses). In this case, the UE may steer the non-GBR QoS flow to the other side access without signaling to the SMF. In the case of the GBR QoS flow, the UE may transmit, to the network, an indication indicating that steering is wished to be performed through a PDU session modification procedure, and, when a PDU session modification command is received or when a PDU session modification command including an indication indicating that the steering is allowed is received, the UE may steer a data flow to the other side access.

As an example of the second method, if it is assumed that some data flows in a GBR flow for the non-3GPP access is transferred to a 3GPP access, the UE may operate as follows.

Figure 17:
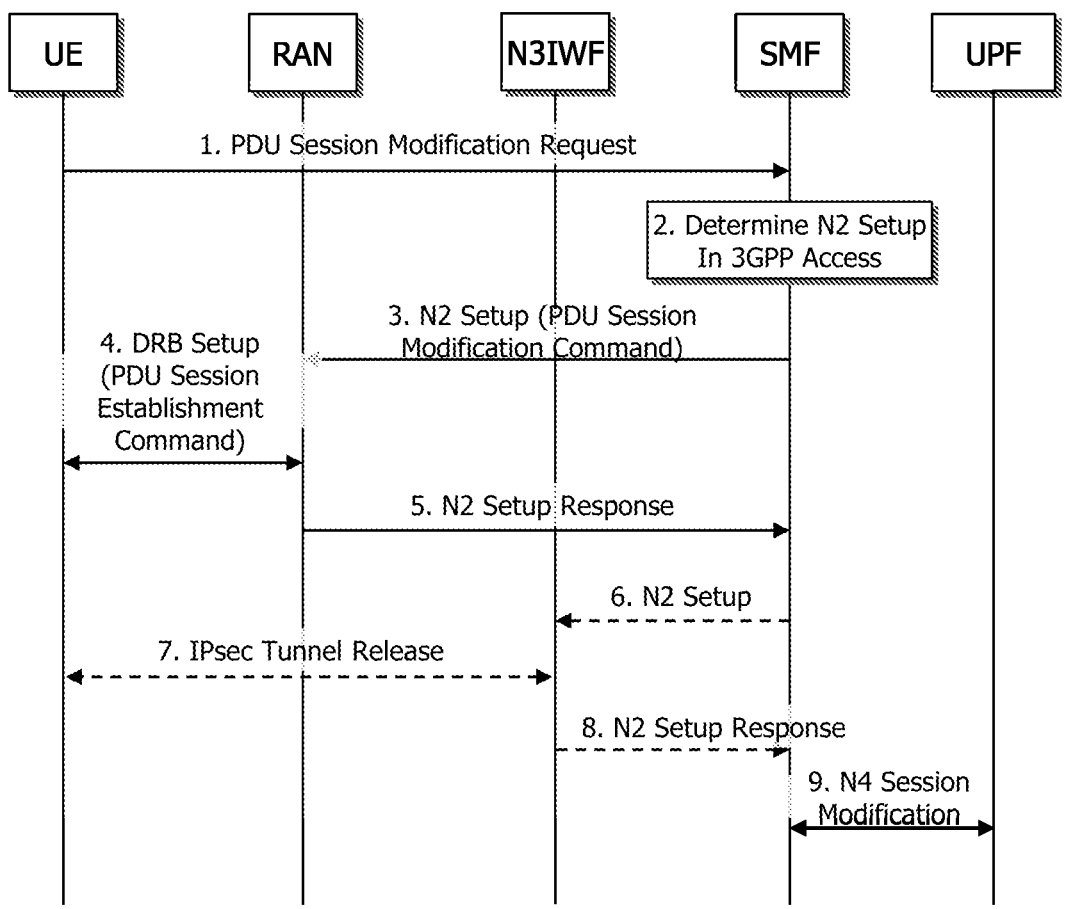
FIG. 17 illustrates an example of a PDU session modification procedure according to a second method of a second disclosure.

FIG. 17 illustrates an example of a PDU session modification procedure according to the second method of the second disclosure.

A UE illustrated in FIG. 17 is assumed to have established a MA-PDU session to a 5GS.

1) When the UE wishes to transfer a GBR QoS flow present in a non-3GPP to a 3GPP access based on a steering rule, the UE transmits a PDU session modification request message to an SMF through the 3GPP access that is the target to which the data flow is to be transferred. This message may include an indication indicating that the UE request steering, and information regarding which QoS flow is transferred (e.g., flow information through QFI or packet filter information, identity information regarding a QoS rule, or identity information regarding an ATSSS steering rule). If the UE wishes to transfer all GBR QoS flows present in the non-3GPP of a corresponding PDU session to the 3GPP access, the UE may include information indicating all GBR QoS flows (e.g., All, *, and the like), instead of information on the respective QoS flow, as described above.

2) When it is determined, based on the information transmitted by the UE, that an N2 setup for a QoS flow has not been made in the 3GPP access (or when it is determined that an N2 setup for a QoS flow should be made in the 3GPP access), the SMF transmits an N2 setup message to an RAN.

3) In this case, since the PDU session modification request has been received through the 3GPP access, the SMF also transmits a PDU session modification command message in response to the PDU session modification request. The PDU session modification command message may include an indication indicating that the UE is allowed to start steering. If the RAN is not allowed to accept an N2 setup for a corresponding QoS flow, an N1 message is not transmitted according to an existing technology. Accordingly, the SMF updates the QoS rule or the steering rule for the UE based on a reject reason included in a corresponding N2 message.

If the RAN fails the N2 setup for a QoS flow, the SMA may directly add an indication to the N2 setup in order not to transmit an N1 message to the UE, so that the RAN transmits the N1 message to the UE only when the N2 setup is completed successfully.

When the RAN sets up the QoS flow successfully, a mapping relation between the QoS flow and an AN resource is transmitted through AN signaling. This is an optional process. When there is no change in the mapping relation between the QoS flow and the AN resource (e.g., when a corresponding QoS flow is mapped to a default radio bearer), the mapping information is not updated. In addition, the RAN transmits, to the UE, the PDU session modification command message transmitted by the SMF. After receiving the message, the UE transfers a data flow in the non-3GPP access to the 3GPP access. This may be based on the indication included in the PDU session modification message described above in the process 3, the indication which indicates steering is allowed. Then, in response to the PDU session modification command message, the UE transmits a PDU session modification Ack message.

In the case of a downlink, a UPF may select an access based on the steering rule received from the SMP and may perform transmission. In order to allow a downlink and an uplink to be transmitted to the same access, the SMF may add an indication for the use of the same access when giving a steering rule (e.g., a method for transmitting an uplink data to a downlink receiving access in a similar manner for a reflective QoS), or the SMF may give a steering rule aligned with the UPF and the UE so that the downlink and the uplink are naturally steered to the same access.

5) The SMF may receive, from the RAN, a message indicating that the N2 setup has been established successfully.

6-8) When it is determined, based on the steering rule transmitted to the UE, a GBR QoS flow for the non-3GPP access is no longer necessary, the SMF may release a user plane resource for the non-3GPP access. If the corresponding GBR QoS flow is being used by another data flow, the SMF maintains the GBR QoS flow. Alternatively, without directly releasing the GBR QoS flow, the SMF may wait until a N3IWF detects inactivity of the GBR QoS flow and releases the GBR QoS flow.

9) The SMF provides updated QoS flow information to the UPF. This process may be performed in parallel with other processes after the process 5.

The UE may not perform the PDU session modification procedure and may inform, through a user plane, the SMF of necessity of switching. For example, by transmitting a special traffic to the user plane or including a specific marking in the header that transmits data, the UE may inform that switching is necessary. That is, in the 3GPP access, it is possible to inform the necessity of switching through marking in a SDAP header, and, in the non-3GPP access, it is possible to inform the necessity of switching through marking in a GRE header. In this case, the RAN or N3IWF may perform an operation of marking marking information in the SDAP/GRE header in an N2 header. Upon receiving the marking information, the UEP notifies that the UE request switching of the corresponding data flow. When an AN resource setup is needed, the SMF transmits an N2 setup request message to the AN. When the AN resource setup is made successfully, the SMF may transmit signaling again to the UPF and the UPF notifies the UE through the user plane. Then, the UE may receive marking information through the user plane or, after an elapse of a predetermined period of time, the UE may start switching.

II-3. Third Method of the Second Disclosure: Method for Using a Common QoS Rule and a Non-Common QoS Rule Together This method is a method in which a common QoS rule is used for a Non-GBR QoS flow and a QoS rule for each access is used for a GBR QoS flow. If this method is used, a UE may perform steering on Non-GBR QoS flows without transmitting signaling to an SMF, in the same manner of the second method.

In the case of GBR QoS flows, in order to request the same QoS as a QoS used in a source access from the SMF, the UE may create the same QoS in the target access by transmitting a PDU session modification request message to a target access and then perform steering.

In the above-described first to third methods, when the UE transmits the PDU session modification request message to the SMF to request a QoS flow setup, the Ue transmits information on a data flow desired to be transferred. This information may be QFI of the data flow desired to be transferred or may be transmitted in the form of a packet filter. If the SMF fails to set up, in the target access, the same QoS flow as a QoS flow of the source access, a steering rule regarding the corresponding data flow may be updated or a QoS may be updated.

In the above-described first to third methods, the Ue may not transmit the PDU session modification request message and instead may a network may perform PDU session modification directly. To this end, with respect to GBR QoS flows, the UE always needs to transmit uplink traffic only to the same access as an access that receives downlink traffic. That is, the terminal does not directly select an access by an ATSSS rule and perform transmission and instead transmits traffic only to an access determined by the network. Since the network is always aware of whether a resource for a GBR QoS flow is allocated to the corresponding access, traffic is transmitted to an access in which the GBR QoS flow is set up well and the UE performs transmission to the same access. To this end, since the UE is not aware of an access to which the GBR QoS flow is to be transmitted first, a default access value needs to be determined. For this, a value known to the UE by the ATSSS rule or preset in the UE may be used. In addition, in order to indicate transmission of a traffic to an access to which the network transmits a downlink, the network may provide information regarding the ATSSS rule or may deliver the corresponding information through marking of a user plane, in a similar manner of a reflective QoS. Alternatively, aligned steering rules may be given to the UPF and the UE so that steering may be naturally performed to the same access.

When the UPF performs downlink steering by the ATSSS rule transmitted by the SMF, the UPF is not aware of whether a GBR QoS flow is set up in the corresponding access, and thus, the UPF needs to checks whether traffic switching is allowed, through interaction with the SMF. To this end, through an N4 modification procedure before performing the traffic switching, the UPF transmits, to the SMP, an indication regarding whether it is possible to change the access, in addition to information regarding a specific traffic. When receiving a relevant message from the UPF, the SMF checks whether a radio resource is set up for a GBR QoS flow for the corresponding traffic and may inform the UPF of whether the traffic switching is allowed. If the radio resource is not set up, the SMF performs a radio resource set up for the corresponding GBR QoS flow using the PDU session modification procedure. If this procedure is failed, the SMF may transmit, to the UPF, an indication indicating that the traffic switching is not allowed and/or an updated ATSSS.

II-4. Summary of the Second Disclosure

This chapter will describe a method for supporting a QoS for an MA PDU session.

A QoS flow is a minimum unit for differentiating QoS in an MA PDU session, and the OoS flow may not be associated with a specific access. When a data flow is steered between two accesses, the same QoS flow may be used.

When the MA PDU session is established, an SMF may provide QoS rules to a UE. Based on the QoS rules, the UE may classify and mark an uplink user plane traffic and, in other words, associate an uplink traffic to the QoS flow. The QoS rules may be used commonly for a 3GPP access and a non-3GPP access, and QoS classification may be irrespective of an ATSSS steering rule. The SMF may provide a default QoS rule to the UE.

When an MA PDU session is established, the SMF may provide a Packet Detection Rule (PDR) to the UE. The UPF may classify and mark a downlink user plane traffic based on the PDR. The PDR may be used commonly for a 3GPP access and a non-3GPP access, and QoS classification may be irrespective of the ATSSS steering rule.

When an MA-PDU session is established, the SMF may provide a QoS profile to a RAN and a N3IWF. Based on the QoS profile, the RAN and the N3IWF may perform mapping with AN resources. Resource allocation may be performed irrespective of a type of a QoS flow (that is, a non-GBR QoS flow and a GBR QoS flow). This may enable dynamic traffic steering between a 3GPP access and a non-3GPP access.

When an MA PDU session is established through separate PDU session establishment procedures and when the SMF transmits a PDU session establishment accept message to a second access, the SMF may not provide a QoS rule to the UE. In this case, in order to establish AN resources for a QoS flow (for example, establishment of a radio bearer, IPsec SA, and a QoS flow are mapped to AN resources), the SMF may provide the QoS file to an AN.

Hereinafter, management of a GBR QoS flow will be described.

When the GBR QoS flow is established, a UE enters a CM-DLE state in one access. For example, when there is no traffic on a 3GPP access, an RAN has no activity on the 3GPP access and thus may request N2 connection release. Then, the UE enters a CM-IDLE state in the 3GPP access. Further, when the UE moves out of the non-3GPP access coverage, the UE enters the CM-IDLE state in the 3GPP access. In this case, the SMF may not release the GBR QoS flow and may not update a QoS rule and a PDR which are associated with the GBR QoS flow. When the UE enters a CM CONNECTED state, the SMF may request establishment of AN resources for the GBR QoS flow from the AN.

Hereinafter, verification of a downlink GBR QoS flow will be described.

In order to ensure establishment of AN resources, before access switching, a UE performs a PDU session modification procedure and transmits an indication indicating that the UE transmits a GBR QoS flow to another access. Alternatively, instead of performing the PDU session modification procedure, the UE may transmit a special traffic to a user plane to inform the UPF of the fact that traffic switching is to be performed. When the SMF receives the indication and when an AN resource for the GBR QoS flow is not established, the SMF may request establishment of the AN resource for the GBR QoS flow from the AN.

Figure 18:
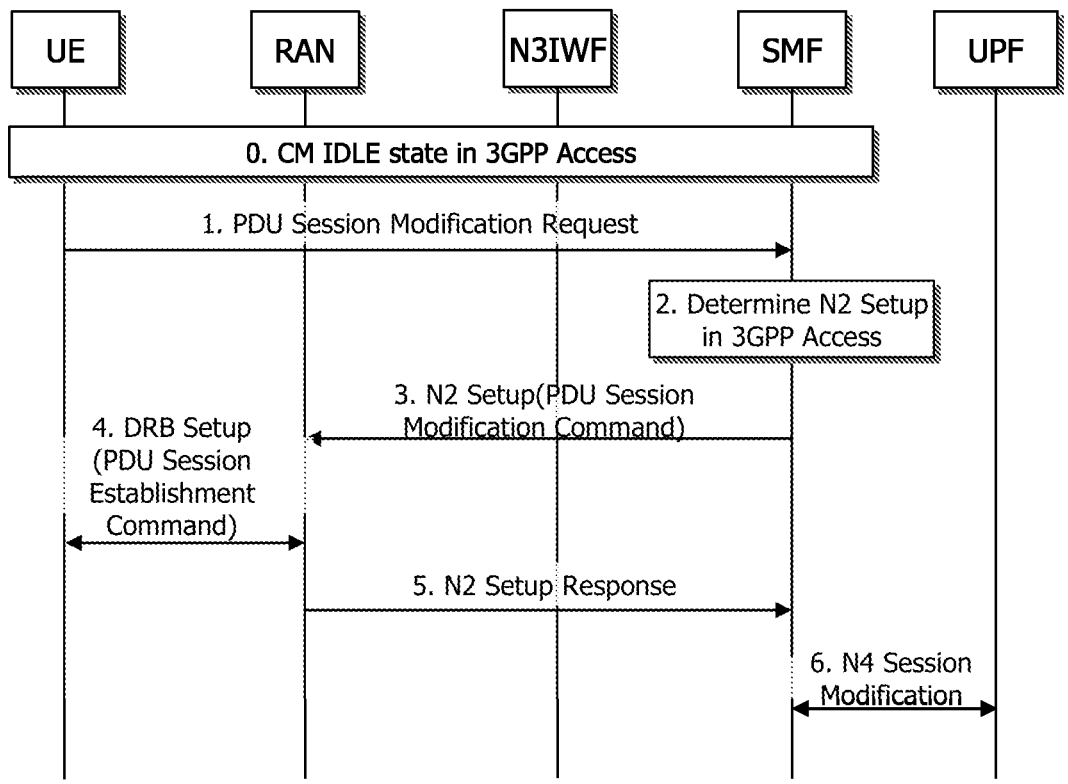
FIG. 18 illustrates a PDU session modification procedure for an MA PDU session.

FIG. 18 illustrates a PDU session modification procedure for an MA PDU session.

An UE may transmit a data flow of a GBR QoS flow on a non-3GPP access and may be in CM IDLE state on a 3GPP access.

1) When the UE wishes to change the data flow of the GBR QoS flow to the 3GPP access, the UE transmits a PDU session modification request message including a switching indication. Since the UE is in the CM IDLE state, the UE may transmit a service request message before transmitting the PDU session modification request message. The Ue transmits the PDU session modification request message on the 3GPP access. The PDU session modification request message may include the same QoS information as that of aGBR QoS flow which is a target to move. Accordingly, the SMF may be aware of which QoS flow needs to be moved to the 3GPP access.

2) Based on the received information, the SMF discovers an affected QoS. In order to establish an RAN resource required for the QoS flow, the SMF determines to transmit a request message to the RAN.

3) The SMF transmits an N2 setup message to the RAN. The SMF may include, in the N2 setup message, a PDU session modification command message. In addition, the SMF may include, in the message, an indication indicating that the UE transmits a data flow on the 3GPP access.

4) The RAN performs radio resource establishment. The RAN transmits the PDU session modification command message to the UE. When the PDU session establishment command message is received, the UE switches a data flow based on a steering rule.

5) The RAN transmits an N2 setup response message. When the RAN rejects establishment of the QoS flow, the SMF updates the QoS rule and/or the steering rule.

Hereinafter, verification of a downlink GBR QoS flow will be described.

In order to ensure establishment of AN resources, before access switching, a UPF performs an N4 session level report procedure. In addition, the UPF transmits an indicating transmission of the GBR QoS flow to another access. When the SMF receives the indication and when the AN for the GBR QoS flow has not yet been established, the SMF may request establishment the AN resource for the GBR QoS flow from an AN.

Figure 19:
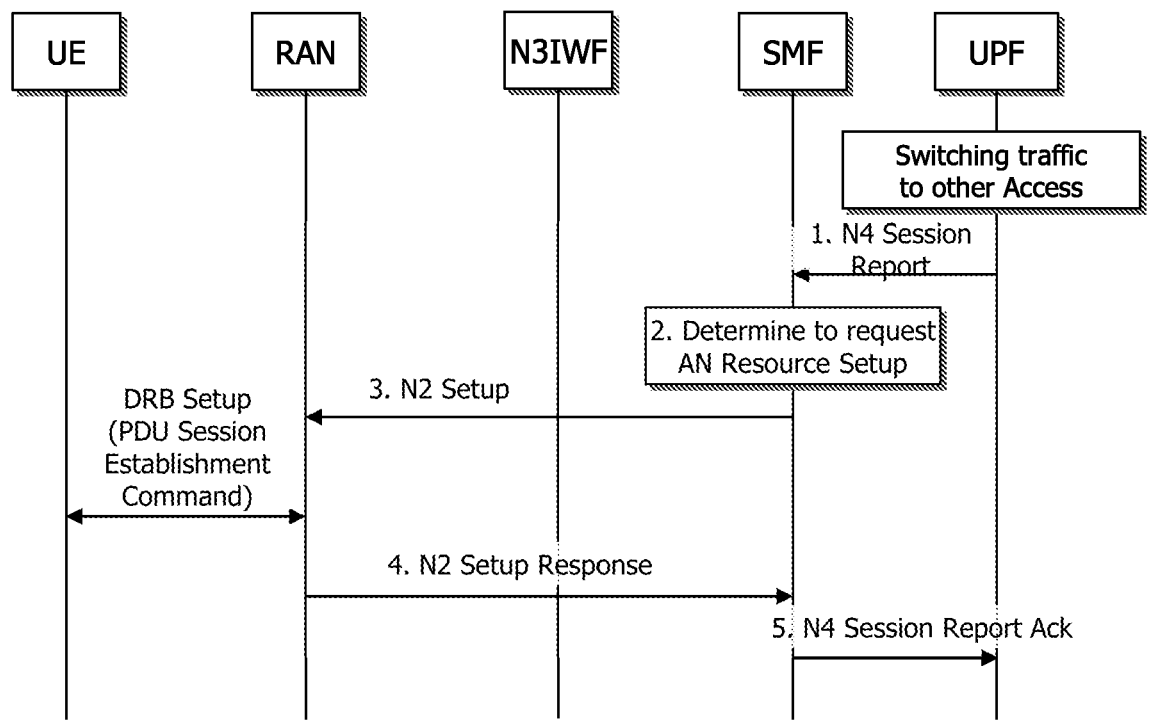
FIG. 19 is a signal flowchart illustrating a downlink GBR QoS flow verification procedure using an N4 session level report procedure.

FIG. 19 is a signal flowchart illustrating a downlink GBR QoS flow verification procedure using an N4 session level report procedure.

1) When a UPF wishes to switch a data flow of a GBR QoS flow to a 3GPP access, the UPF transmits a switching indication while performing the N4 session report procedure.

2) Based on the received information, the SMF discovers an affected QoS flow. In addition, if a corresponding resource for the QoS flow has not yet been allocated, the SMF may determine to request establishment of an RAN resource necessary for the QoS flow from the RAN.

3) The SMF transmits a N2 setup message to the RAN.

4) The RAN performs a radio resource establishment procedure and transmits a response message to the SMF.

5) The SMF transmits an N4 session report Ack message, and transmits an indication indicating that the UPF is allowed to transmit a data flow on the 3GPP access.

Figure 20:
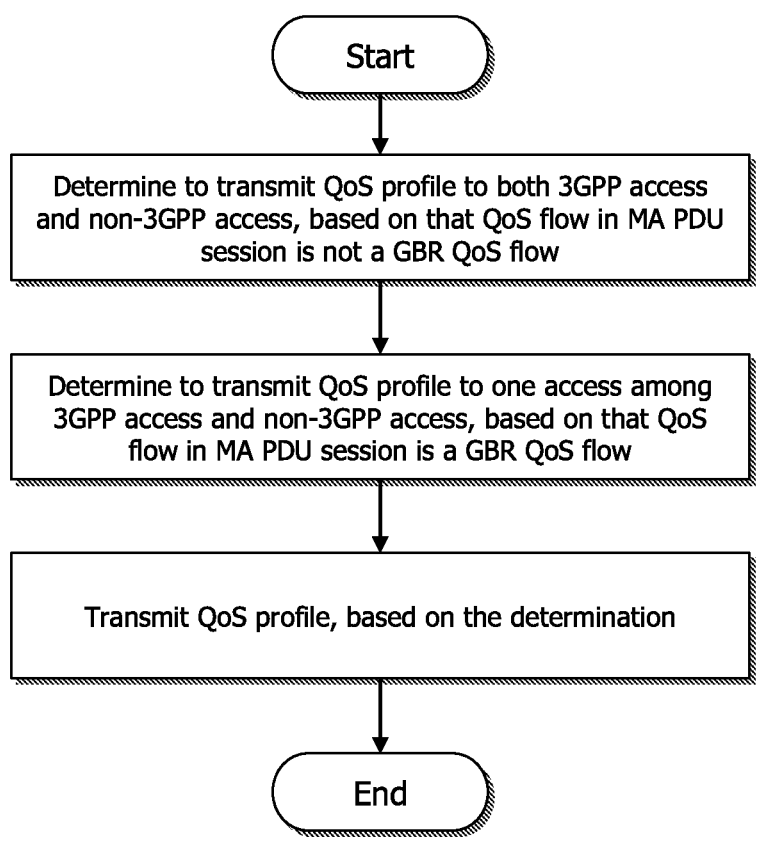
FIG. 20 is a diagram illustrating an example of a method according to one disclosure of the specification.

FIG. 20 is a diagram illustrating an example of a method according to one disclosure of the specification.

Referring to FIG. 20, based on a QoS flow in an MA PDU session which is not a GBR QoS flow, an SMF node may determine to transmit a QoS profile to both a 3GPP access and a non-3GPP access.

Alternatively, based on a QoS flow in an MA PDU session which is a GBR QoS flow, the SMF node may determine to transmit a QoS profile to one access among the 3GPP access and the non-3GPP access.

Based on the determination, the SMF node may transmit the QoS profile.

The SMF may determine one access among the 3GPP access and the non-3GPP access.

Based on establishment of the MA PDU session, the SMF may transmit the QoS rule to a UE.

The QoS rule may be used commonly for both the 3GPP access and the non-3GPP access.

The MA PDU session may be established on both the 3GPP access and the non-3GPP access.

When the GBR QoS flow needs to move from a first access, which corresponds to one of the 3GPP access and the non-3GPP access, to a second access which corresponds to the other one of the 3GPP access and the non-3GPP access, according to a steering rule, the SMF may receive an indication indicating that switching from the UPF is needed.

The indication may include information on a QoS flow that is a target of switching and information on the second access that is a target access of switching.

The SMF may inform the UPF of successful completion of switching of the GBR QoS flow.

The QoS profile may be transmitted based on the indication.

The indication indicating the successful completion of switching of the GBR QoS flow may allow the UPF to switch to the second access.

An access to which the QoS profile is transmitted may be an access currently in use. The QoS profile may be used to set up a resource on the access currently in use.

The contents described so far may be implemented in hardware. This is described with reference to the drawing.

Figure 21:
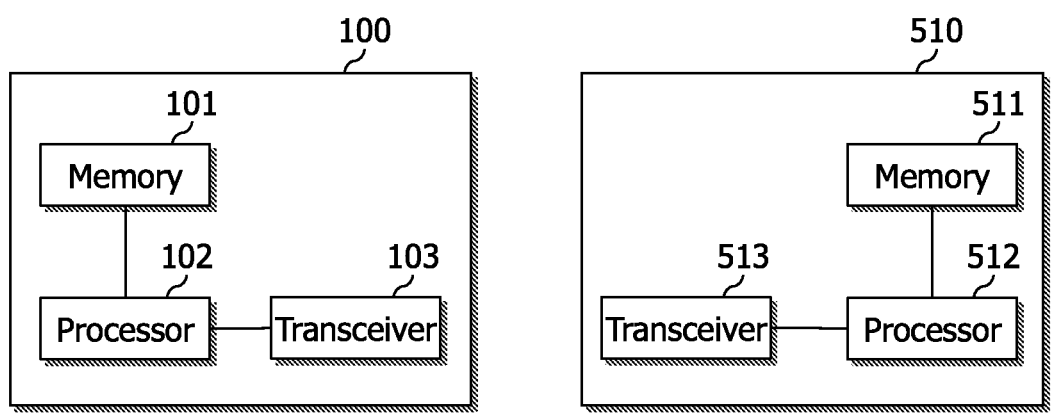
FIG. 21 is a configuration block diagram of a UE and a network node according to an embodiment of the present disclosure.

FIG. 21 is a configuration block diagram of a UE and a network node according to an embodiment of the present disclosure.

As illustrated in FIG. 21, the UE 100 includes a memory 101, a processor 102, and a transceiver 103. Further, the network node may be any one of an AMF, an SMF, an NEF, and an AF. The network node may include a memory 511, a processor 512, and a transceiver 513.

The memories may include a read-only memory (ROM), a random access memory (RAM), a flash memory, a memory card, a storage medium, and/or any other storage device.

The aforementioned memories stores the above method.

The processors may include an application-specific integrated circuit (ASIC), a different chipset, a logic circuit, and/or a data processing device.

The processors control the memories and the transceivers, respectively. Specifically, the processors execute the above methods stored in the memories, respectively. Further, the processors transmit the above signals through the transceiver.

The transceivers may include base band circuits for processing radio frequency signals.

When the embodiment is implemented in a software manner, technologies described in the present specification may be implemented by modules (e.g., procedures, functions, and the like) for performing functions described in the present specification. The module may be stored in the memory 101 and may be executed by the processor 102. The memory 101 may be provided inside the processor 102. Alternatively, the memory 101 may be provided outside the processor 102 and may be connected to the processor 102 through various well known technologies known in the technical field to which the present disclosure pertains.

Figure 22:
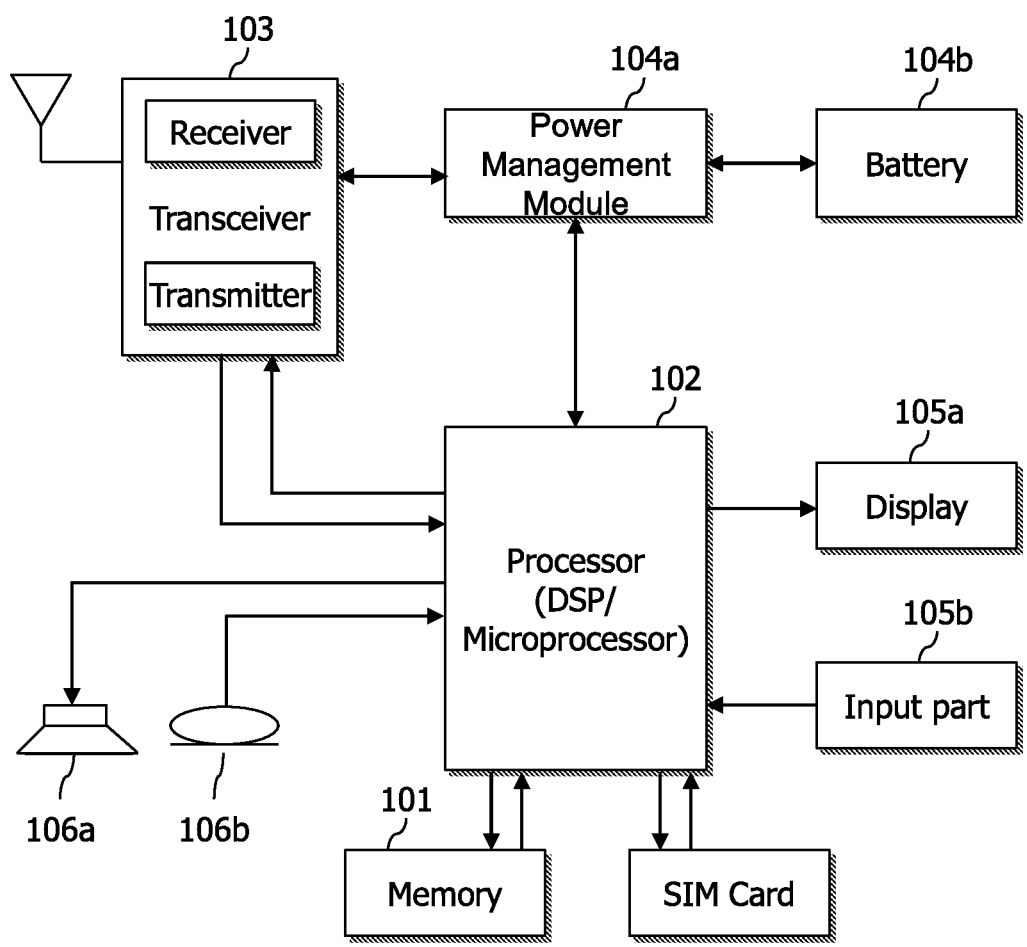
FIG. 22 is a block diagram illustrating a detailed configuration of a UE according to an embodiment of the present disclosure.

FIG. 22 is a block diagram illustrating a detailed configuration of a UE according to an embodiment of the present disclosure.

A UE includes a memory 101, a processor 102, a transceiver 103, a power management module 104a, a battery 104b, a display 105a, an input part 105b, a speaker 106a, a microphone 106b, a subscriber identification module (SIM) card, and one or more antennas.

The processor 102 may implement functions, procedures and/or methods described in the present specification. Layers of a wireless interface protocol may be implemented by the processor 102. The processor 102 may include an application-specific integrated circuit (ASIC), a different chipset, a logic circuit, and/or a data processing device. The processor 102 may be an application processor (AP). The processor 102 may include at least one of a digital signal processor, a central processing unit (CPU), a graphics processing unit (GPU), a modem (e.g., modulator and demodulator). Examples of the processor 102 include a SNAPDRAGON™ series processor made by Qualcomm®, an EXYNOS™ series processor made by Samsung®, a HELIO™ series processor made by MediaTek®, an ATOM™ series processor made I INTEL®, or a next generation processor corresponding thereto.

The power management module 104a manages power for the processor 102 and/or the transceiver 103. The battery 104b supplies power to the power management module 104a. The display 105a outputs a processing result from the processor 102. The input part 105b receives an input to be used by the processor 02. The input part 105b may be disposed on the display 105a. The SIM card may is an integrated circuit, which is used to store an international mobile subscriber identity IIMSI) used to identify and verify a subscriber in a mobile phone device, such as a mobile phone and a computer and a key related to the IMSI in a safe manner. Contact information may be stored in many SIM cards.

The memory 101 is operably connected to the processor 102 and store a variety of information to operate a processor 610. The memory 101 may include a read-only memory (ROM), a random access memory (RAM), a flash memory, a memory card, a storage medium, and/or any other storage device. When the embodiment is implemented in software, technologies described in the present specification may be implemented by modules performing functions described in the present specification. The modules may be stored in the memory 101 and may be executed by the processor. The memory 101 may be provided inside the processor 102. Alternatively, the memory 101 may be provided outside the processor 102 and may be connected to the processor 102 through various well known technologies known in the technical field to which the present disclosure pertains.

The transceiver 103 is operably connected to the processor 102 and receives and/or receives a radio signal. The transceiver 103 includes a transmitter and a receiver. The transceiver 103 may include a base band circuit for processing a radio frequency signal. The transceiver 103 control one or more antennas to transmit and/or receive a radio signal.

The speaker 106a outputs a result regarding sound processed by the processor 102. The microphone 106b receives an input regarding sound to be used by the processor 102.

Although exemplary embodiments of the present disclosure have been described above, the scope of the present disclosure is not limited to the specific embodiments and the present disclosure may be modified, changed, or improved in various ways within the scope of the present disclosure and the category of the claims.

What is claimed is:

1. A method for supporting a quality of service (QoS), the method performed by a session management function (SMF) node and comprising:
   receiving a request message related to a protocol data unit (PDU) session,
   wherein the PDU session relates to a multi-access (MA) PDU session over a 3rd generation partnership project (3GPP) access and a non-3GPP access; and
   transmitting a QoS profile,
   wherein the QoS profile is transmitted to both of the 3GPP access and the non-3GPP access, based on (i) that the QoS flow is non-guaranteed bit rate (non-GBR) QoS flow, and
   wherein the QoS profile is transmitted to a first access between the 3GPP access and the non-3GPP access, based on (ii) that the QoS flow is a GBR QoS flow.

2. The method of claim 1, further comprising:
   determining the first access to transmit the QoS profile,
   wherein the first access is determined based on (iii) that the first access is being used.

3. The method of claim 1, further comprising:
   transmitting a QoS rule to a user equipment (UE) based on that the MA PDU session is established.

4. The method of claim 3, wherein the QoS rule is commonly used for both the 3GPP access and the non-3GPP access.

5. The method of claim 1, wherein the MA PDU session is established over both the 3GPP access and the non-3GPP access.

6. The method of claim 1, further comprising
transmitting a steering rule to one or more of a user equipment (UE) and a user plane function (UPF),
wherein the steering rule allows the QoS flow to be steered to one or more access among the 3GPP access and the non-3GPP access.

7. The method of claim 1, further comprising,
when moving the GBR QoS flow from the first access to a second access among the 3GPP access and the non-3GPP access based on a steering rule, receiving from a UPF information representing that switching is necessary,
wherein the received information comprises first information regarding the QoS flow that is a target of switching and second information regarding the second access that is a target access of switching.

8. The method of claim 7, further comprising
transmitting, at the SMF, third information informing the UPF of successful completion of the switching of the GBR QoS flow,
wherein:
the QoS profile is transmitted based on the received information, and
the third information informing the successful completion of the switching of the GBR QoS flow allows the UPF to perform switching to the second access.

9. The method of claim 1, wherein:
the first access to which the QoS profile is transmitted is an access currently in use, and
the QoS profile is used to set up a resource on the access currently in use.

10. A session management function (SMF) for supporting a quality of service (QoS), the SMF comprising:
a transceiver; and
a processor configured to control the transceiver, wherein the processor performs operations of:
receiving a request message related to a protocol data unit (PDU) session,
wherein the PDU session relates to a multi-access (MA) PDU session over a 3rd generation partnership project (3GPP) access and a non-3GPP access; and transmitting a QoS profile,
wherein the QoS profile is transmitted to both of the 3GPP access and the non-3GPP access, based on (i) that the QoS flow is non-guaranteed bit rate (non-GBR) QoS flow, and
wherein the QoS profile is transmitted to a first access between the 3GPP access and the non-3GPP access, based on (ii) that the QoS flow is a GBR QoS flow.

11. The SMF of claim 10, wherein the processor is further configured to perform:
determining the first access to transmit the QoS profile,
wherein the first access is determined based on (iii) that the first access is being used.

12. The SMF of claim 10, wherein the processor is further configured to perform:
transmitting a QoS rule to a user equipment (UE) based on that the MA PDU session is established.

13. The SMF of claim 12, wherein the QoS rule is commonly used for both the 3GPP access and the non-3GPP access.

14. The SMF of claim 12, the MA PDU session is established over both the 3GPP access and the non-3GPP access.

15. The SMF of claim 10, wherein:
the processor is further configured to transmit a steering rule to one or more of a user equipment (UE) and a user plane function (UPF), and
the steering rule allows the QoS flow to be steered to one or more access among the 3GPP access and the non-3GPP access.

16. The SMF of claim 10, wherein the processor is further configured to receive, from a UPF through the transceiver, information representing that switching is necessary, when moving the GBR QoS flow from the first access to a second access among the 3GPP access and the non-3GPP access based on a steering rule,
wherein the received information comprises first information regarding the QoS flow that is a target of switching and second information regarding the second access that is a target access of switching.

17. The SMF of claim 16, wherein, the processor is further configured to transmit, through the transceiver, third information informing the UPF of successful completion of the switching of the GBR QoS flow,
wherein:
the QoS profile is transmitted based on the received information, and
the third information informing the successful completion of the switching of the GBR QoS flow allows the UPF to perform switching to the second access.

* * * * *